(12) United States Patent
Lee et al.

(10) Patent No.: US 8,934,447 B2
(45) Date of Patent: Jan. 13, 2015

(54) METHOD AND APPARATUS FOR COMMUNICATION WITH A NETWORK IN A WIRELESS COMMUNICATION SYSTEM

(75) Inventors: Hyun Woo Lee, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 13/582,946

(22) PCT Filed: Mar. 4, 2011

(86) PCT No.: PCT/KR2011/001518
§ 371 (c)(1),
(2), (4) Date: Sep. 5, 2012

(87) PCT Pub. No.: WO2011/108891
PCT Pub. Date: Sep. 9, 2011

(65) Prior Publication Data
US 2012/0327896 A1 Dec. 27, 2012

Related U.S. Application Data

(60) Provisional application No. 61/310,717, filed on Mar. 5, 2010.

(30) Foreign Application Priority Data

Mar. 4, 2011 (KR) .......................... 10-2011-0019403

(51) Int. Cl.
*H04W 4/00* (2009.01)
*H04W 72/04* (2009.01)
*H04W 52/02* (2009.01)

(52) U.S. Cl.
CPC ........ *H04W 72/044* (2013.01); *H04W 52/0229* (2013.01); *Y02B 60/50* (2013.01)
USPC .......... 370/330; 370/331; 370/328; 370/329; 455/450; 455/464; 455/509

(58) Field of Classification Search
CPC ............ H04W 72/04; H04W 52/0229; H04W 72/044
See application file for complete search history.

(56) References Cited

U.S. PATENT DOCUMENTS

2008/0095037 A1* 4/2008 Chang et al. ................... 370/204
2009/0268675 A1* 10/2009 Choi ............................. 370/329

(Continued)

OTHER PUBLICATIONS

S. Choi et al., "MAC Scheduling Scheme for VoIP Traffic Service in 3G LTE", IEEE VTC, Sep. 30, 2007.

(Continued)

*Primary Examiner* — Anez Ebrahim
(74) *Attorney, Agent, or Firm* — McKenna Long & Aldridge LLP

(57) ABSTRACT

The present invention relates to a method and apparatus for performing communications by adjusting a resource unit. Efficient allocation of resource units can minimize power consumption. The minimization of power consumption brings about great advantages to M2M (machine-to-machine) communication. A terminal can transmit or receive data via different resource units. In this case, the resource units can be determined by MS. That is, some MS may use a particular resource unit, while the others may use a different resource unit. When different resource units are given, corresponding radio resource regions are also determined differently from one another. However, the total number of tones corresponding to the resource units may be the same.

12 Claims, 33 Drawing Sheets

(56) References Cited

U.S. PATENT DOCUMENTS

2010/0046451 A1    2/2010  Tada et al.
2010/0113105 A1*   5/2010  Xu et al. .................... 455/572
2010/0124197 A1    5/2010  Pi

OTHER PUBLICATIONS

3GPP TR 25.814 v.7.1.0 (Sep. 2006), $3^{rd}$ Generation Partnership Project; Technical Specification Group Radio Access Network; Physical Layer Aspects for Evolved Universal Terrestrial Radio Access (UTRA) (Release 7).

* cited by examiner

FIG. 20
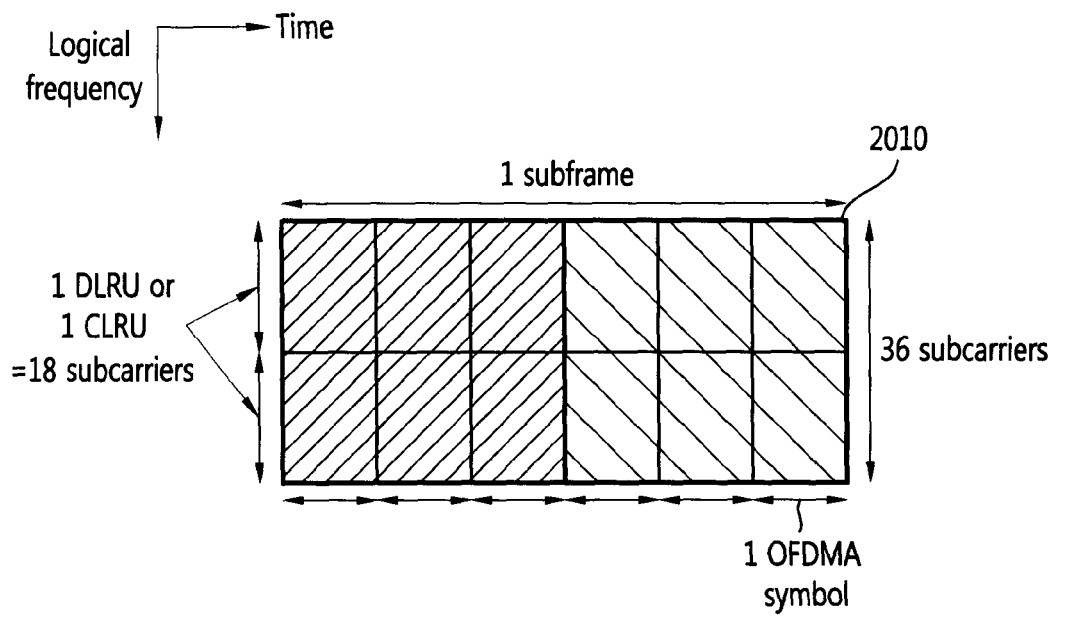
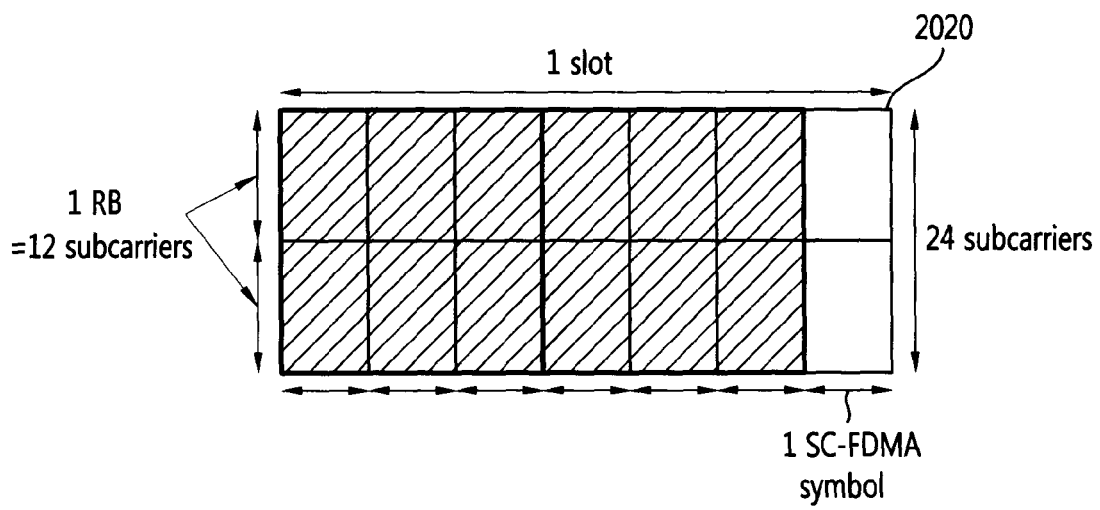

METHOD AND APPARATUS FOR COMMUNICATION WITH A NETWORK IN A WIRELESS COMMUNICATION SYSTEM

This Application is a 35 U.S.C. §371 National Stage Entry of International Application No. PCT/KR2011/001518, filed Mar. 4, 2011 and claims the benefit of U.S. Provisional Application No. 61/310,717, filed Mar. 5, 2010 and Korean Application No: 10-2011-0019403, filed Mar. 4, 2011, all of which are incorporated by reference in their entirety herein.

TECHNICAL FIELD

The present invention relates to a method and apparatus for communicating with a network in a wireless communication system and, more specifically, to a method and apparatus for transmitting and receiving signals based on a plurality of resource units.

BACKGROUND ART

In a wireless communication system, a terminal communicates with a network through physical resources. In this case, resource units for uplink and downlink may be configured. The resource units are determined by the network (e.g., a base station), and the terminal may perform communication through uplink and downlink according to the resource units determined by the network. If a wireless communication system uses an Orthogonal Frequency-Division Multiple Access (OFDMA) or Single Carrier Frequency-Division Multiple Access (SC-FDMA) scheme, resource units may correspond to radio resources including a plurality of subcarriers and a plurality of symbols (e.g., OFDMA symbols or SC-FDMA symbols).

DISCLOSURE

Technical Problem

In a common communication system, physical resources may be allocated based on a basic resource unit. The basic resource unit may mean the smallest unit of physical resource allocation and/or physical resource scheduling.

A basic resource unit used in a communication system is described in more detail below. For example, in a communication system that complies with Institute of Electrical and Electronics Engineers (IEEE) 802.16m, a basic resource unit is identical both in downlink and uplink. That is, one Physical Resource Unit (PRU) may be defined as 18 subcarriers *n OFDMA symbols. In this case, n may be determined as 6 in the case of type-1, as 7 in the case of type-2, as 5 in the case of type-3, and as 9 in the case of type-4. Meanwhile, a communication system in accordance with IEEE 802.16m may send a signal through a Distributed Logical Resource Unit (DLRU) or a Contiguous LRU (CLRU). In this case, the size of radio resources allocated to the DLRU or the CLRU is identical with the size of radio resources allocated to a PRU, but methods of allocating the radio resources in the frequency domain are different from each other.

Furthermore, a basic resource unit in the uplink of a system in accordance with 3GPP Long Term Evolution (LTE) may be one Resource Block (RB) or may be one subframe including two RBs that are contiguous to each other in the time domain. In this case, the RB may be $N_{sc}^{RB}$ (=12) subcarriers*$N_{symb}^{UL}$ (7 in the case of a normal cyclic prefix and 6 in the case of an extended cyclic prefix) SC-FDMA symbols.

Meanwhile, in 3GPP LTE downlink, a basic resource unit may be one Resource Block (RB) or may be one subframe including two RBs that are contiguous to each other in the time domain. If Δf is 15 kHz, a basic resource unit may be one RB ($N_{sc}^{RB}$ (=12) subcarriers*$N_{symb}^{UL}$ (7 in the case of a normal cyclic prefix and 6 in the case of an extended cyclic prefix) SC-FDMA symbols) or may be two RBs that are contiguous to each other in the time domain. If Δf is 7.5 kHz, a basic resource unit may be one RB ($N_{sc}^{RB}$ (=24) subcarriers*$N_{symb}^{DL}$ (3 in the case of an extended cyclic prefix) SC-FDMA symbols) or may be two RBs that are contiguous to each other in the time domain. In this case, the size of radio resources allocated to a Virtual Resource Block (VRB) is identical with the size of radio resources allocated to an RB, but methods of allocating the radio resources in the frequency domain are different from each other.

The above contents are summarized as follows. In the case of an IEEE 802.16m system, a basic resource unit uses 18 subcarriers within one OFDMA symbol and uses 108, 126, 90, or 162 subcarriers in one subframe. Furthermore, in the case of a 3GPP LTE system, a basic resource unit uses 12 (24 when Δf is 7.5 kHz) subcarriers within one OFDMA symbol (or one SC-FDMA symbol) and uses 84 or 72 subcarriers within one subframe. That is, a minimum bandwidth that may be used by a terminal is 196.8750 kHz (=18 subcarriers)*(10.9375 kHz)) in the case of an IEEE 802.16m system and is 180 kHz (=12 subcarriers)*(15 kHz)) in the case of a 3GPP LTE system. Detailed subcarrier spacing may be changed.

Maximum transmit power available for a terminal is smaller than a base station. For example, in general, a base station may have maximum transmit power of 43 dBm, whereas a terminal may have maximum transmit power of 23 dBm. If a base station and an MS have the same transmit power, greater power per subcarrier may be used according to a reduction of the bandwidth. For example, if a signal is transmitted through 18 subcarriers using transmit power of 23 dBm, power of 23 dBm/18 per subcarrier may be used. If a signal is transmitted through 180 subcarriers, however, only power of 23 dBm/108 per subcarrier may be used. Accordingly, if a small bandwidth is used, a cell coverage can be extended because the intensity of a signal per subcarrier is increased. Furthermore, if a small bandwidth is used, a larger number of terminals can be efficiently supported in the time domain.

Mobile communication so far has been developed around Human-2-Human (H2H) communication, but it is expected that the use of Machine-2-Machine (M2M) communication will be increased. It is expected that the super-low power design will be applied and the importance of a communication system capable of supporting a larger number of terminals will be enhanced because numerous sensors can be used without the supply of fixed power in the case of this M2M communication.

Furthermore, in the case of smart metering that is expected to be widely used in applications using M2M communication, latency may not be much taken into account and the amount of data may be smaller than that of M2M communication. To this end, in an application using M2M communication, the size of the frequency domain may be reduced and the size of the time domain may be increased.

The present invention proposes a communication scheme for a low power design. A communication method and apparatus according to the present invention may be used in applications using M2M communication as well as other applications.

Technical Solution

In accordance with an aspect of the present invention, there is provided a method of a Mobile Station (MS) communicating with a network in a wireless communication system. The method includes receiving a signal from the network and obtaining data for the MS which is included in the signal, wherein the signal includes data for a plurality of MSs, the data for the plurality of MSs is allocated to radio resources based on a plurality of resource units, the plurality of resource units is determined depending on an MS corresponding to each of the resource units, the plurality of resource units corresponds to frequency-time resources comprising at least one subcarrier in a frequency domain and at least one symbol in a time domain, and the plurality of resource units corresponds to frequency-time resources of different regions.

Preferably, each of the plurality of resource units corresponds to an identical number of tones.

Preferably, the plurality of resource units is determined based on a basic resource unit, the basic resource unit includes at least n subcarriers in the frequency domain and m symbols in the time domain, n and m are specific natural numbers, the number of subcarriers included in each of the plurality of resource units is determined to be a positive number times the n, and the number of symbols included in each of the plurality of resource units is determined to be a positive number times the m.

Preferably, the plurality of MSs includes a first MS and a second MS, first data for the first MS is scheduled in a first resource unit for the first MS, second data for the second MS is scheduled in a second resource unit for the second MS, and the first resource unit and the second resource unit correspond to the frequency-time resources of the different regions.

Preferably, the radio resources for the MS are allocated in a Virtual Basic Resource Unit (VBRU), the VBRU is generated from an Original Basic Resource Unit (OBRU), the VBRU is extended m times greater than the OBRU in the frequency domain m and reduced m times smaller than the OBRU in the time domain, and the m is a specific natural number.

Preferably, the symbol is an Orthogonal Frequency-Division Multiple Access (OFDMA) symbol, and the subcarriers are consecutively disposed or distributed and disposed.

Preferably, the symbol is a Single Carrier Frequency-Division Multiple Access (SC-FDMA) symbol, and the subcarriers are consecutively disposed or distributed and disposed.

In accordance with another aspect of the present invention, there is provided a method of an MS communicating with a network in a wireless communication system. The method includes receiving a first signal on which first data is allocated based on a first resource unit and receiving a second signal on which second data is allocated based on a second resource unit, wherein the first and the second resource units correspond to frequency-time resources comprising at least one subcarrier in a frequency domain and at least one symbol in a time domain, the first resource unit and the second resource unit correspond to frequency-time resources of different regions, and the second resource unit is generated from the first resource unit.

Preferably, the frequency domain of the second resource unit is extended m times greater than the frequency domain of the first resource unit, the time domain of the second resource unit is reduced m times smaller than the time domain of the first resource unit, and the m is a specific natural number.

The frequency domain of the second resource unit is reduced m times smaller than the frequency domain of the first resource unit, the time domain of the second resource unit is extended m times greater than the time domain of the first resource unit, and the m is a specific natural number.

The frequency domain of the second resource unit is extended m times greater than the frequency domain of the first resource unit or the time domain of the second resource unit is reduced m times smaller than the time domain of the first resource unit and the m is a specific natural number.

Advantageous Effects

In accordance with the present invention, radio resources are allocated through a variety of resource units, and thus power consumption can be minimized or the cell coverage can be extended. The minimization of power consumption or the extension of the cell coverage are important in, particularly, M2M communication.

BRIEF DESCRIPTION OF THE DRAWINGS

FIG. 20 is an example in which radio resources are allocated based on a VBRU that occupies a fixed size in the time domain.

MODE FOR INVENTION

Figure 1:
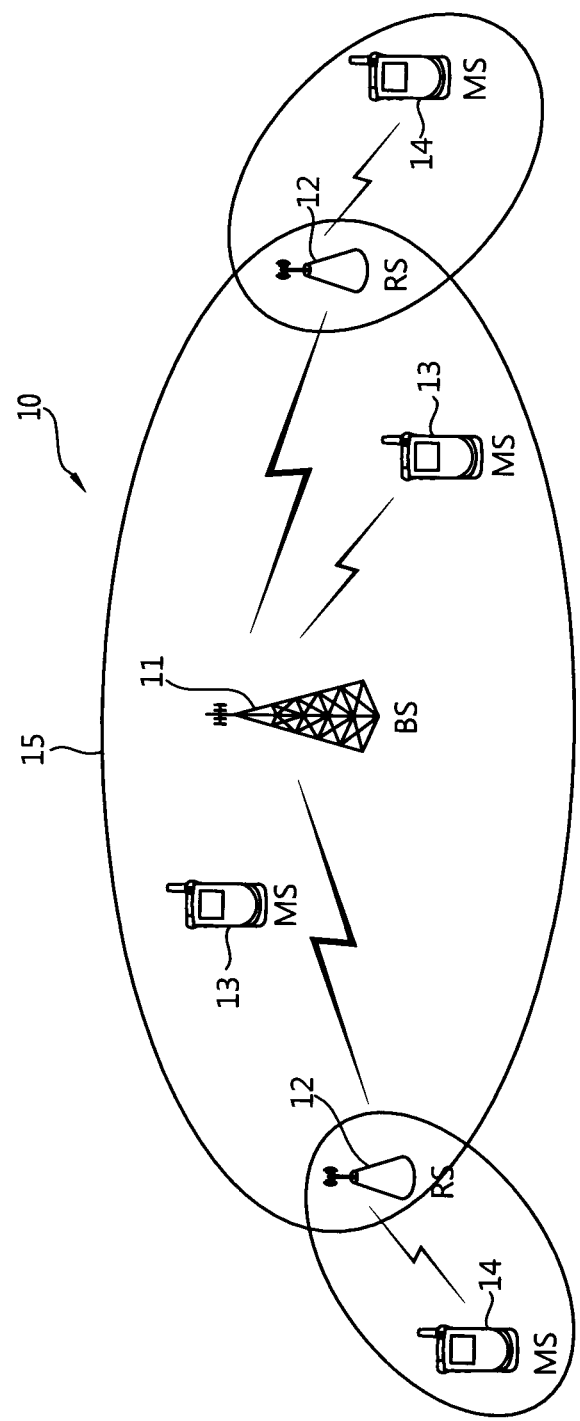
FIG. 1 shows a wireless communication system including MSs.

A communication method and apparatus described hereinafter allocate radio resources on the basis of a virtual basic resource unit which occupies a smaller bandwidth than a basic resource unit. The virtual basic resource unit is usefully used in an M2M communication system which permits low latency.

Another method and apparatus described hereinafter allocate radio resources on the basis of a virtual basic resource unit which uses a smaller number of OFDMA symbols than a basic resource unit. If the virtual basic resource unit is used, power consumption can be reduced because additional operations are reduced. That is, if the same amount of data is transmitted through a plurality of OFDMA symbols, the total power consumption of a mobile station may be increased because additional operations, such as FFT processing, are necessary although energy for all bits is the same. Accordingly, it is preferred that the same amount of data be transmitted through minimum OFDMA symbols according to circumstances.

In embodiments described hereinafter, a variety of Virtual Basic Resource Units (VBRUs) is used. A variety of examples of a VBRU, a method of configuring a VBRU, and a communication method and apparatus using a VBRU are described hereinafter.

The following embodiments may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA may be embodied using radio technology, such as Universal Terrestrial Radio Access (UTRA) or CDMA2000. TDMA may be embodied using radio technologies, such as Global System for Mobile communications (GSM)/General Packet Radio Service (GPRS)/Enhanced Data Rates for GSM Evolution (EDGE). OFDMA may be embodied using radio technologies, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA), and it adopts OFDMA in downlink and adopts SC-FDMA in uplink. LTE-Advanced (LTE-A) is the evolution of LTE.

In order to classify a description, hereinafter, the embodiments are described on the basis of IEEE 802.16m and 3GPP Long Term Evolution (LTE). The scope of the present invention is, however, not limited to a detailed communication standard.

IEEE 802.16m is described below. The Institute of Electrical and Electronics Engineers (IEEE) 802.16e standard is a sixth standard for International Mobile Telecommunication (IMT)-2000 in the ITU Radio communication Sector (ITU-R) under the control of the International Telecommunication Union (ITU) in 2007 and was adopted in the name of 'WMAN-OFDMA TDD'. ITU-R is preparing for an IMT-Advanced system as the next-generation 4G mobile communication standard after IMT-2000. IEEE 802.16 Working Group (WG) is a standard for an IMT-Advanced system at the end of the year 2006, and it decided to step up an IEEE 802.16m project with aim at writing an amendment standard of the existing IEEE 802.16e. As can be seen from the aim, the IEEE 802.16m standard contains two aspects: the past continuity of an amendment of the IEEE 802.16e standard and the future continuity of a standard for the next-generation IMT-Advanced system. Accordingly, it is required that the IEEE 802.16m standard maintain compatibility with a mobile WiMAX system based on the IEEE 802.16e standard and also satisfy all advanced requirements for an IMT-Advanced system.

FIG. 1 shows a wireless communication system including MSs.

Referring to FIG. 1, a wireless communication system 10 includes at least one Base Station (BS) 11. Each BS 11 provides communication service to a geographical area 15 commonly called a cell. The cell may be classified into a number of areas, and each of the areas is called a sector. There may be one or more cells in one BS. The BS 11 commonly refers to a fixed station which communicates with a Mobile Station (MS) 13, and it may be called another terminology, such as an evolved NodeB (eNB), a Base Transceiver System (BTS), an access point, an Access Network (AN), an Advanced BS (ABS), a node, or an antenna node. The BS 11 may include Relay Stations (RSs) 12. In this case, the BS 11 may perform functions, such as connectivity between the RS 12 and an MS 14, management, control, and resource allocation.

The Relay Station (RS) 12 refers to a device that relays a signal between the BS 11 and the MS 14, and it may be called another terminology, such as a Relay Node (RN), a repeater, a relay, or an Advanced RS.

The Mobile Station (MS) 13, 14 may be fixed or mobile and may be called another terminology, such as an Advanced Mobile Station (AMS), a User Terminal (UT), a Subscriber Station (SS), a wireless device, a Personal Digital Assistant (PDA), a wireless modem, a handheld device, an Access Terminal (AT), or User Equipment (UE). Hereinafter, a macro MS refers to an MS which directly communicates with the BS 11, and an RS MS refers to an MS which communicates with an RS. Although the macro MS 13 is placed within the cell of the BS 11, the macro MS 13 may communicate with the BS 11 via the RS 12 in order to improve the transfer rate according to a diversity effect.

Between a BS and a macro MS, downlink (DL) refers to communication from the BS to the macro MS, and uplink (UL) refers to communication from the macro MS to the BS. Between a BS and an RS, DL refers to communication from the BS to the RS, and UL refers to communication from the RS to the BS. Between an RS and an RS MS, DL refers to communication from the RS to the RS MS, and UL refers to communication from the RS MS to the RS.

Figure 2:
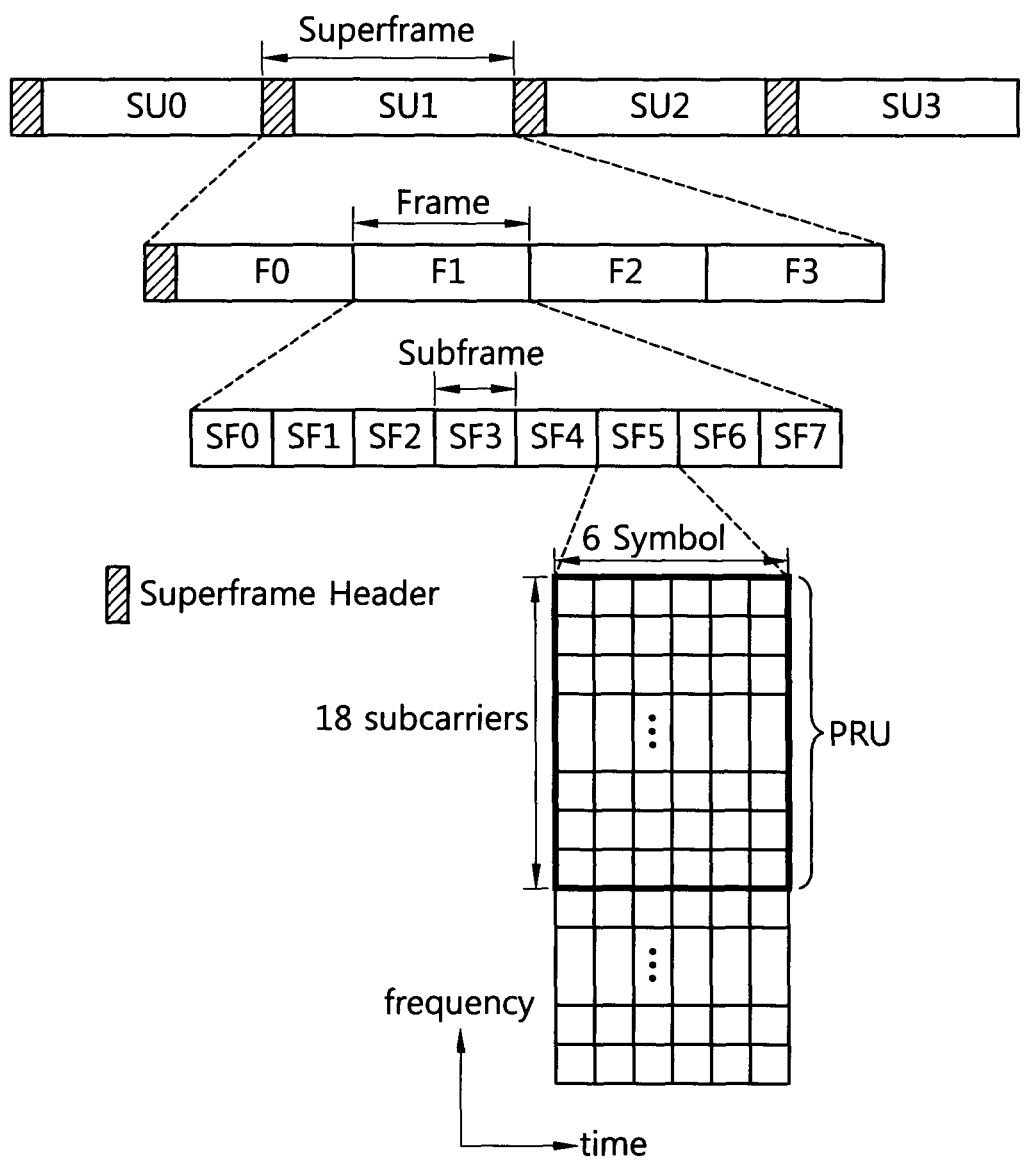
FIG. 2 shows an example of a frame structure.

FIG. 2 shows an example of a frame structure.

Referring to FIG. 2, a superframe (SF) includes a superframe header (SFH) and four frames F0, F1, F2, and F3. The frames of the superframe may have the same length. The size of each superframe is illustrated as being 20 ms and the size of each frame is illustrated as being 5 ms, but not limited thereto. The length of a superframe, the number of frames included in a superframe, and the number of subframes included in a frame, etc. may be changed in various ways. The number of subframes included in a frame may be changed in various ways depending on a channel bandwidth and the length of a Cyclic Prefix (CP).

One frame includes a plurality of subframes SF0, SF1, SF2, SF3, SF4, SF5, SF6, and SF7. Each of the subframes may be used for uplink or downlink transmission. One subframe includes a plurality of Orthogonal Frequency Division Multiplexing (OFDM) symbols or Orthogonal Frequency Division Multiple Access (OFDMA) symbols in the time domain and includes a plurality of subcarriers in the frequency domain. The OFDM symbol is for representing one symbol period and may be called another terminology, such as an OFDMA symbol or an SC-FDMA symbols, depending on a multiple access method. A subframe may include 5, 6, 7, or 9 OFDMA symbols, but this is only illustrative. The number of OFDMA symbols included in a subframe is not limited. The number of OFDMA symbols included in a subframe may be changed in various ways depending on a channel bandwidth or the length of a CP. The type of subframe may be defined depending on the number of OFDMA symbols included in a subframe. For example, a type-1 subframe may be defined as including 6 OFDMA symbols, a type-2 subframe may be defined as including 7 OFDMA symbols, a type-3 subframe may be defined as including 5 OFDMA symbols, and a type-4 subframe may be defined as including 9 OFDMA symbols. One frame may include subframes all having the same type. Or, one frame may include subframes having different types. That is, the number of OFDMA symbols included in each of subframes within a frame may be the same o different. Or, the number of OFDMA symbols of at least one of subframes within one frame may be different from the number of OFDMA symbols of the remaining subframe within the frame.

A Time Division Duplex (TDD) method or a Frequency Division Duplex (FDD) method may be applied to a frame. In the TDD method, each subframe is used for uplink transmission or downlink transmission at different times in the same frequency. That is, subframes within the frame of the TDD method are divided into an uplink subframe and a downlink subframe in the time domain. A switching point refers to a point at which a transmission direction is changed from an uplink region to a downlink region or a downlink region to an uplink region, and the number of switching points within each frame in the TDD method may be two. In the FDD method, each subframe is used for uplink transmission or downlink transmission at different frequencies at the same time. That is, subframes within the frame of the FDD method are divided into an uplink subframe and a downlink subframe in the frequency domain. Uplink transmission and downlink transmission occupy different frequency bands, and they may be performed at the same time.

Figure 3:
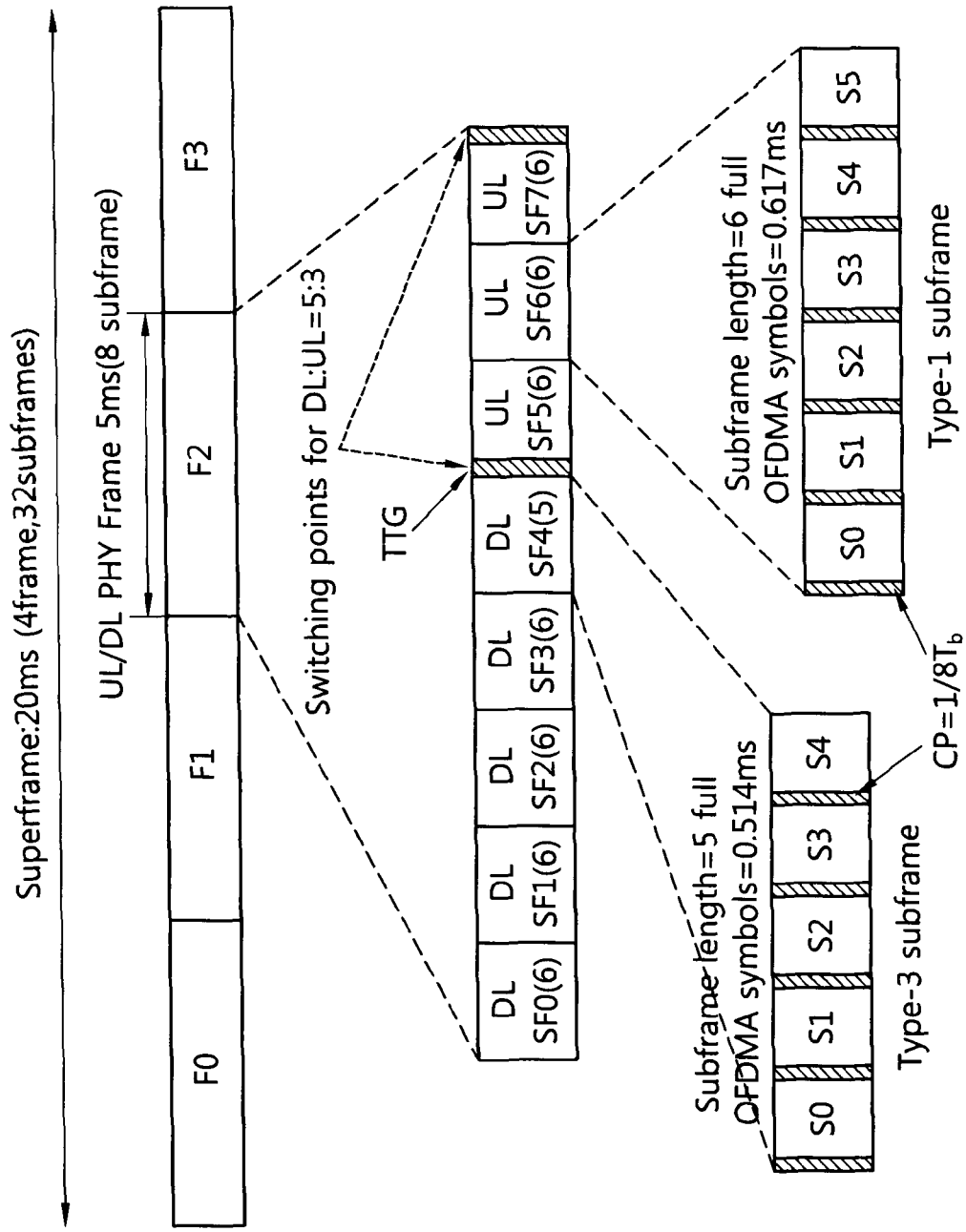
FIG. 3 shows an example of a TDD frame structure.

FIG. 3 shows an example of a TDD frame structure. This figure shows the case where G=⅛. A superframe having a length of 20 ms includes four frames F0, F1, F2, and F3 each having a length of 5 ms. One frame includes 8 subframes SF0, SF1, SF2, SF3, SF4, SF5, SF6, and SF7, and a ratio of downlink subframes and uplink subframes is 5:3. The TDD frame structure of FIG. 3 may be applied to the case where a bandwidth is 5 MHz, 10 MHz, or 20 MHz. SF4, that is, the last downlink subframe, includes 5 OFDM symbols, and each of the remaining subframes includes 6 subframes. An illustrated TTG indicates a transition gap between the uplink and downlink subframes.

Figure 4:
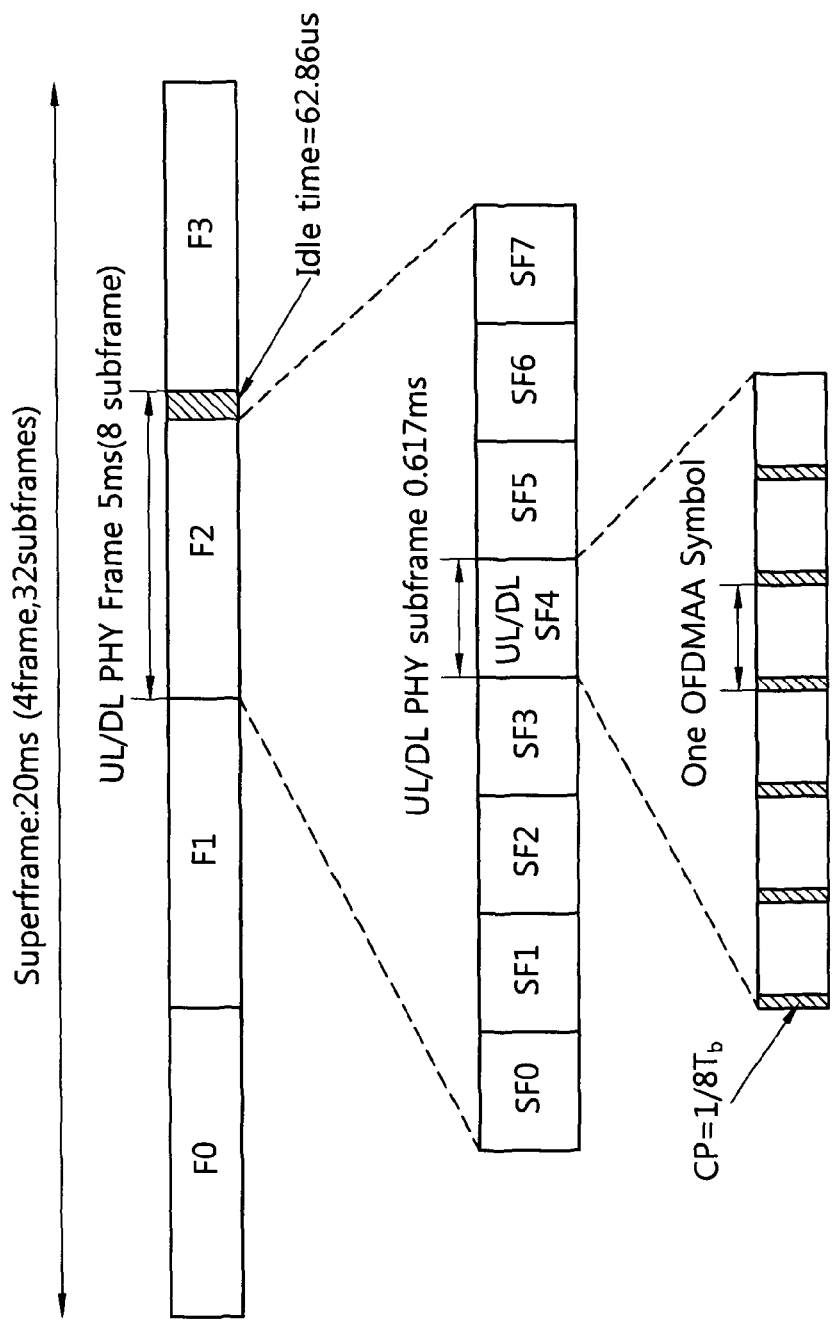
FIG. 4 shows an example of an FDD frame structure.

FIG. 4 shows an example of an FDD frame structure. This figure shows the case where G=⅛. A superframe having a length of 20 ms includes four frames F0, F1, F2, and F3 each having a length of 5 ms. One frame includes 8 subframes SF0, SF1, SF2, SF3, SF4, SF5, SF6, and SF7, and all the subframes include a downlink region and an uplink region. The FDD frame structure of FIG. 4 may be applied to the case where a bandwidth is 5 MHz, 10 MHz, or 20 MHz.

Figure 5:
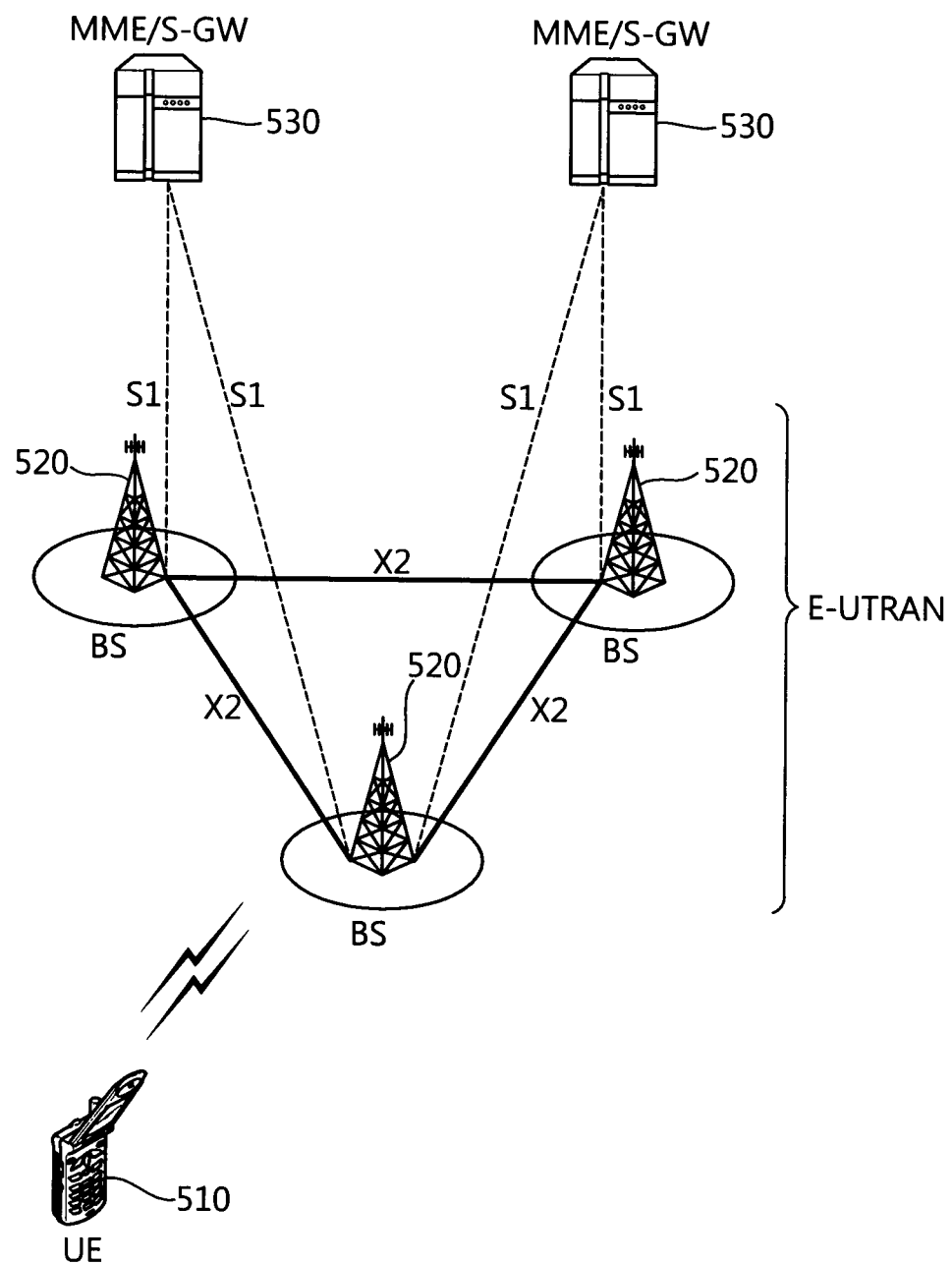
FIG. 5 is a block diagram showing a wireless communication system according to an E-UMTS system.

An Evolved-Universal Mobile Telecommunications System (E-UMTS) or LTE system is described below. FIG. 5 is a block diagram showing a wireless communication system according to an E-UMTS system. The E-UMTS system may also be called a Long Term Evolution (LTE) system. Wireless communication systems are widely deployed in order to provide a variety of communication services, such as voice and packet data.

Referring to FIG. 5, an Evolved-UMTS Terrestrial Radio Access Network (E-UTRAN) includes Base Stations (BS) 520 each of which provides a control plane and a user plane.

User Equipment (UE) 510 may be fixed or mobile and may be called another terminology, such as a Mobile station (MS), a User Terminal (UT), a Subscriber Station (SS), or a wireless device. The BS 520 commonly refer to a fixed station which communicates with the UE 510, and it may be called another terminology, such as an evolved-NodeB (eNB), a Base Transceiver System (BTS), or an access point. One BS 520 can provide service at least one cell. The cell is an area where the BS 520 provides communication services. An interface for user traffic or control traffic transmission may be used between the BSs 520. Hereinafter, downlink refers to transmission from the BS 520 to the UE 510, and uplink refers to transmission from the UE 510 to the BS 520.

The BSs 520 may be coupled through an X2 interface. The BS 520 is connected to an Evolved Packet Core (EPC), more particularly, a Mobility Management Entity (MME)/Serving Gateway (S-GW 530 through an S1 interface. The S1 interface supports a many-to-many-relation between the BS 520 and the MME/S-GW 530.

The layers of a radio interface protocol between UE and a network may be classified into a first layer L1, a second layer L2, and a third layer L3 on the basis of the three lower layers of an Open System Interconnection (OSI) model that is widely known in a communication system. The first layer is a physical (PHY) layer. The second layer may be split into a Medium Access Control (MAC) layer, a Radio Link Control (RLC) layer, and a Packet Data Convergence Protocol (PDCP) layer. The third layer is a Radio Resource Control (RRC) layer.

A wireless communication system may be based on Orthogonal Frequency Division Multiplexing (OFDM)/Orthogonal Frequency Division Multiple Access (OFDMA) or based on Single Carrier FDMA (SC-FDMA).

OFDM uses a plurality of orthogonal subcarriers. OFDM uses an orthogonality characteristic between an Inverse Fast Fourier Transform (IFFT) and a Fast Fourier Transform (FFT). A transmitter performs an IFFT on data and sends the data. A receiver restores original data by performing an FFT on a reception signal. A transmitter uses an IFFT in order to combine multiple subcarriers, and a receiver uses a corresponding FFT in order to split multiple subcarriers.

Figure 6:
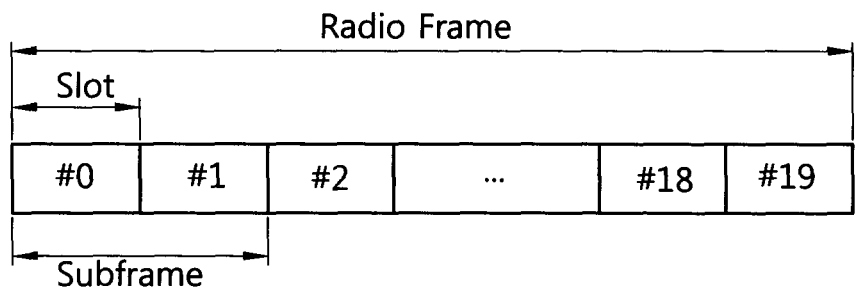
FIG. 6 shows the structure of a radio frame.

FIG. 6 shows the structure of a radio frame. Referring to FIG. 6, the radio frame may include 10 subframes, and each of the subframes may include 2 slots. Slots within the radio frame are assigned slot numbers from No. 0 to No. 19. The time taken to send one subframe is called a Transmission Time Interval (TTI). The TTI may be called a scheduling unit for data transmission. For example, the length of one radio frame may be 10 ms, the length of one subframe may be 1 ms, and the length of one slot may be 0.5 ms. The structure of the radio frame is only illustrative, and the number of subframes included in a radio frame or the number of slots included in a subframe may be changed in various ways.

Figure 7:
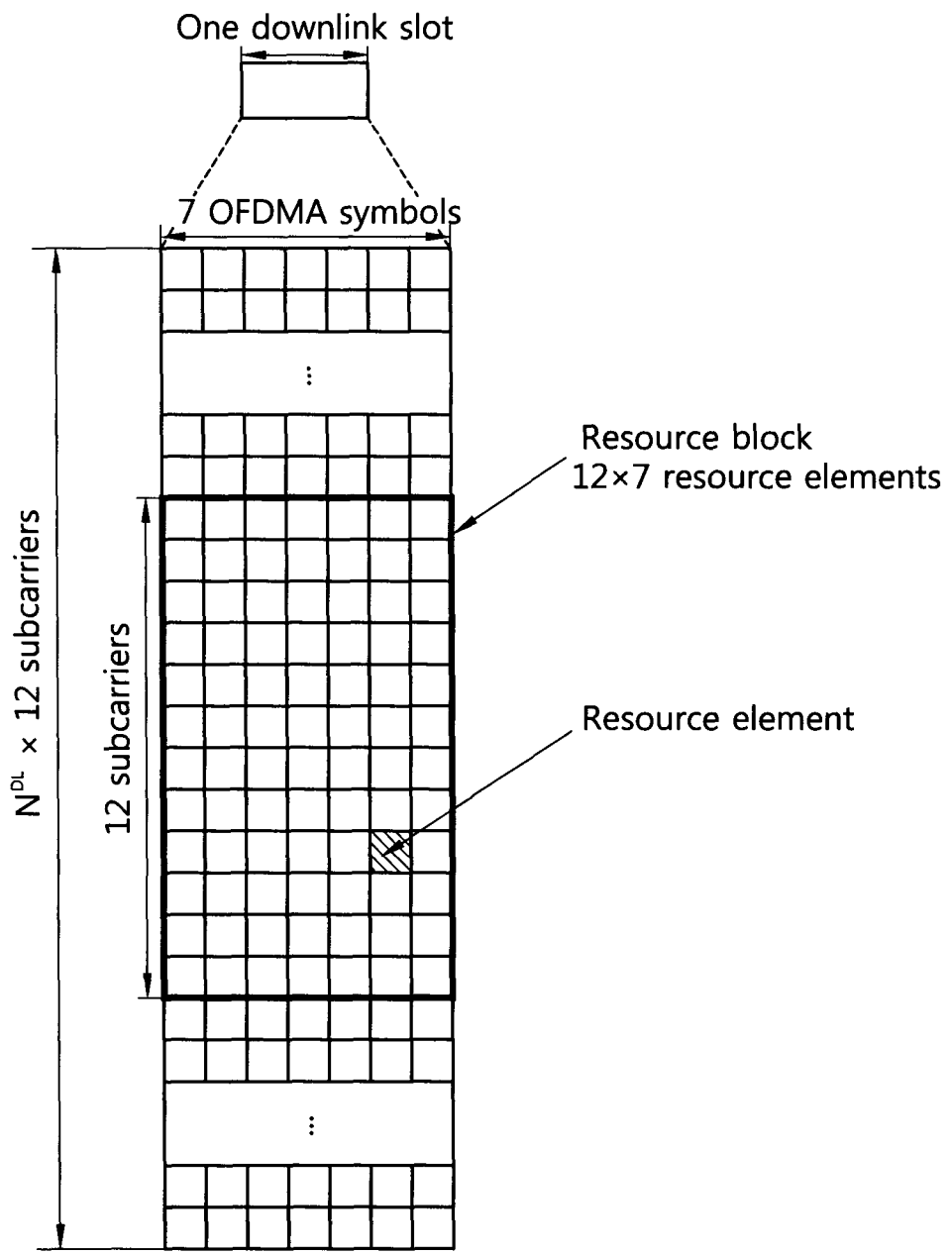
FIG. 7 shows a resource grid for one downlink slot.

FIG. 7 shows a resource grid for one downlink slot. Referring to FIG. 7, the downlink slot includes a plurality of OFDM symbols in the time domain and an $N^{DL}$ Resource Block (RB) in the frequency domain. The number of RBs $N^{DL}$ included in the downlink slot depends on a downlink transmission bandwidth that is set in a cell. For example, in an LTE system, the $N^{DL}$ may be any one of 60 to 110. One RB includes a plurality of subcarriers in the frequency domain.

Each of elements on the resource grid is called a resource element. The resource elements on the resource grid may be identified by an index pair (k, l) within a slot. Here, k (k=0, ..., $N^{DL} \times 12-1$) is the index of a subcarrier in the frequency domain, and l (l=0, ..., 6) is the index of an OFDM symbol in the time domain.

Here, one RB is illustrated as including 7×12 resource elements that include 7 OFDM symbols in the time domain and 12 subcarriers in the frequency domain, but the number of OFDM symbols and the number of subcarriers within an RB are not limited thereto. The number of OFDM symbols and the number of subcarriers may be changed in various ways depending on the length of a Cyclic Prefix (CP) and frequency spacing. For example, the number of OFDM symbols is 7 in the case of a normal CP, and the number of OFDM symbols is 6 in the case of an extended CP. In one OFDM symbol, the number of subcarriers may be any one of 128, 256, 512, 1024, 1536, and 2048.

Figure 8:
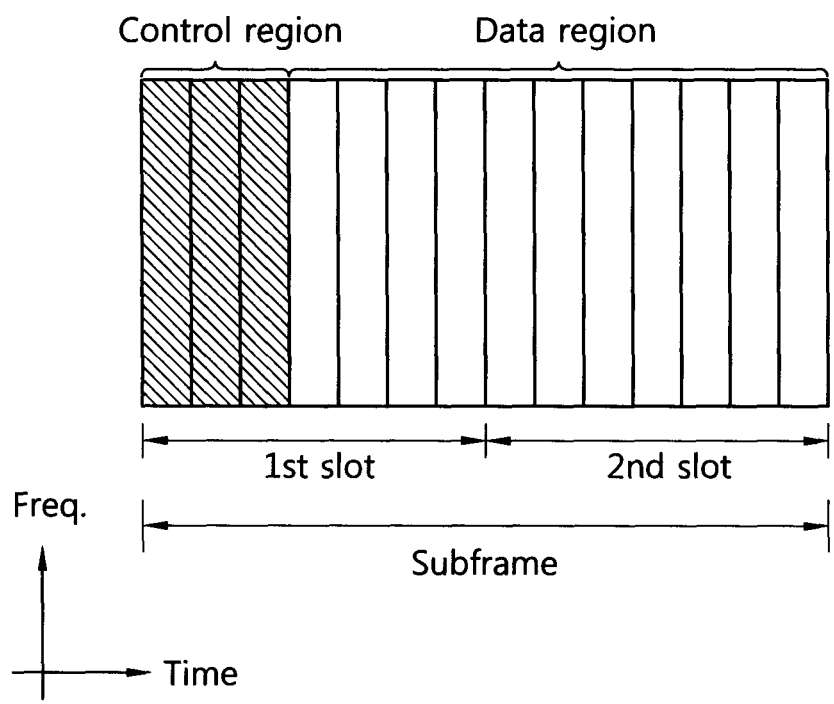
FIG. 8 shows the structure of a downlink subframe.

FIG. 8 shows the structure of a downlink subframe. Referring to FIG. 8, the downlink subframe includes two consecutive slots. The former 3 OFDM symbols of a first slot in the downlink subframe correspond to a control region to which PDCCHs are allocated, and the remaining OFDM symbols correspond to a data region to which PDSCHs are allocated. Control channels, such as a PCFICH and a PHICH, in addition to a PDCCH may be allocated to the control region. An MS can read data information transmitted through a PDSCH by decoding control information transmitted through a PDCCH. Here, the control region is illustrated as including the 3 OFDM symbols, but the control region may include 2 OFDM symbols or 1 OFDM symbol. The number of OFDM symbols included in the control region of a subframe can be checked through a PCFICH.

Control information transmitted through a PDCCH is called Downlink Control Information (hereinafter referred to as DCI). DCI includes uplink scheduling information, downlink scheduling information, system information, uplink power control command, control information for paging, and control information for indicating a random access response (RACH response).

DCI formats include a format 0 for the scheduling of Physical Uplink Shared Channel (PUSCH), a format 1 for the scheduling of one Physical Downlink Shared channel (PDSCH) codeword, a format 1A for the compact scheduling of one PDSCH codeword, a format 1B for compact scheduling on the rank-1 transmission of a single codeword in spatial multiplexing mode, a format 1C for the very compact scheduling of a downlink shared channel (DL-SCH), a format 1D for the scheduling of a PDSCH in multiple user spatial multiplexing mode, a format 2 for the scheduling of a PDSCH in closed-loop spatial multiplexing mode, a format 2A for the scheduling of a PDSCH in open-loop spatial multiplexing mode, a format 3 for the transmission of a Transmission Power Control (TPC) command of 2-bit power control for a PUCCH and a PUSCH, and a format 3A for the transmission of a TPC command of 10 bit power control for a PUCCH and a PUSCH.

Figure 9:
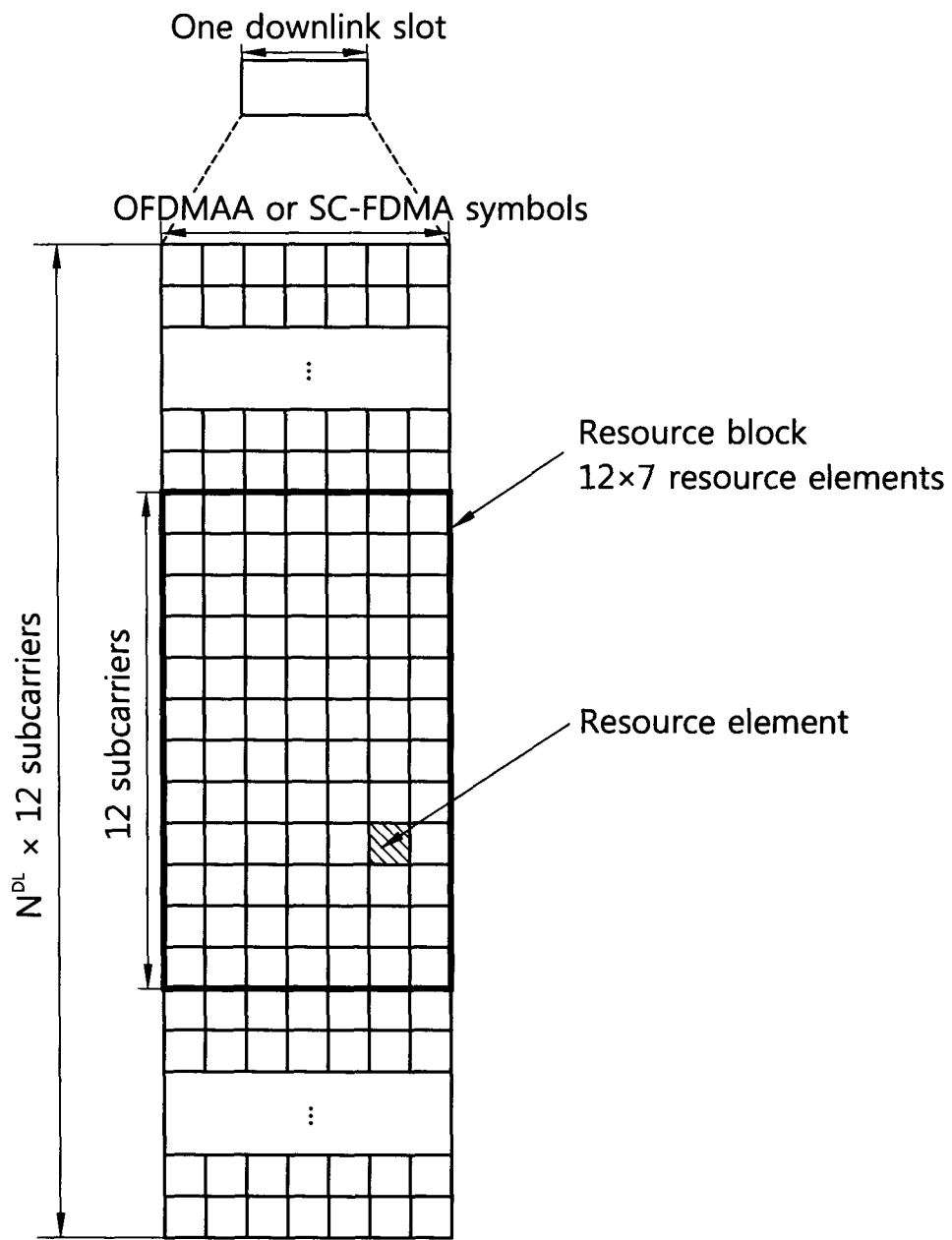
FIG. 9 is an exemplary diagram showing a resource grid for one uplink slot.

FIG. 9 is an exemplary diagram showing a resource grid for one uplink slot. Referring to FIG. 9, the uplink slot includes a plurality of SC-FDMA or OFDMA symbols in the time domain and includes a plurality of RBs in the frequency domain. Here, one uplink slot is illustrated as including 7 SC-FDMA symbols, and one RB is illustrated as including 12 subcarriers, but not limited thereto. The number of RBs $N^{UL}$ included in an uplink slot depends on an uplink transmission bandwidth that is set in a cell.

Figure 10:
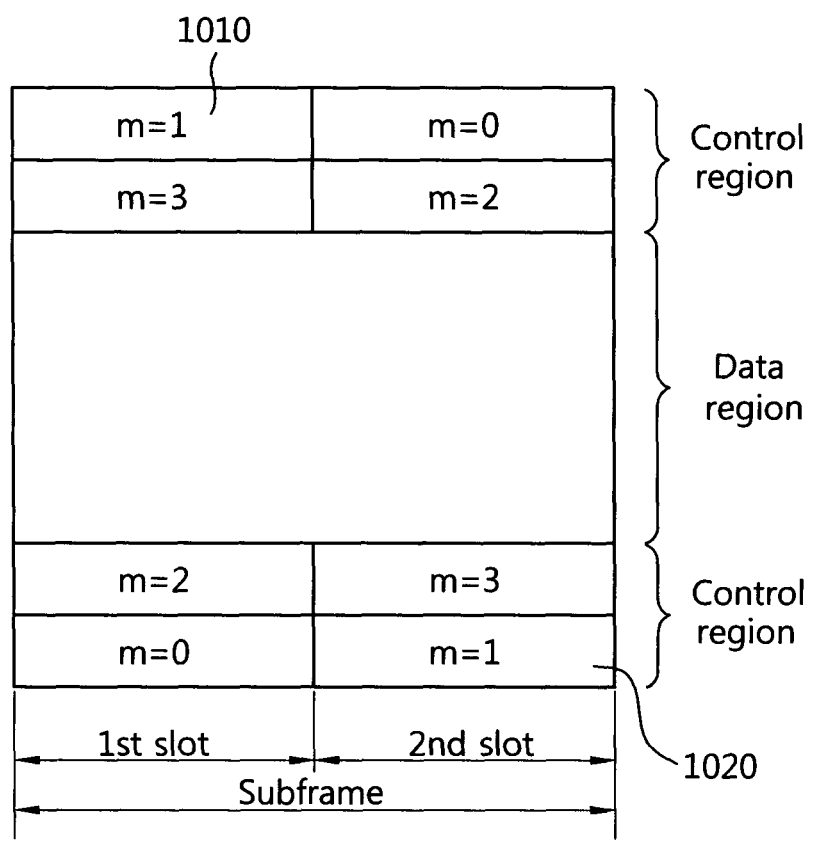
FIG. 10 shows the structure of an uplink subframe.

FIG. 10 shows the structure of an uplink subframe. Referring to FIG. 10, the uplink subframe may be divided into a control region to which Physical Uplink Control Channels (PUCCHs) on which uplink control information is carried are allocated and a data region to which Physical Uplink Shared Channels (PUSCHs) on which user data is carried are allocated in the frequency domain. A PUCCH for one MS is allocated in the form of an RB pair 1010, 1020 in a subframe, and RBs 51 and 52 that belong to an RB pair occupy different subcarriers in each of the two slots. This is said that an RB pair allocated to a PUCCH is subject to frequency hopping at a slot boundary.

The operations and characteristics of a communication apparatus (e.g., an MS and a BS) that operates in the above-described system are described below. Embodiments hereinafter provide a communication apparatus for allocating and using resources through a plurality of basic resource blocks (or basic resource units) in the frequency or time domain.

In the following embodiments, a VBRU is used. The VBRU may include OFDMA symbols (or SC-FDMA symbols) smaller than OFDMA symbols (or SC-FDMA symbols) that are included in a basic resource unit in the frequency domain. Furthermore, the VBRU may use a bandwidth smaller than a bandwidth that is used in a basic resource unit in the time domain.

A basic resource unit is called an Original Basic Resource Unit (OBRU) in order to distinguish the basic resource unit from a Virtual Basic Resource Unit (VBRU), that is, a virtual basic resource unit proposed by the present embodiment. In accordance with the present embodiment, a plurality of different VBRUs may be used at the same time. Furthermore, an OBRU and a VBRU may be used at the same time. Furthermore, different VBRUs may be sequentially used or an OBRU and a VBRU may be sequentially used.

For convenience of description, hereinafter, the number of OFDMA symbols (or SC-FDMA symbols) that form an OBRU is indicated by $N_{sym}$, and the number of subcarriers that form an OBRU is indicated by $P_{sc}$. For example, in a communication system in accordance with IEEE 802.16m, $N_{sym}$ is 6 (in the case of a type-1 subframe), 7 (in the case of a type-2 subframe), 5 (in the case of a type-3 subframe), or 9 (in the case of a type-4 subframe), and $P_{sc}$ is 18.

Meanwhile, the number of OFDMA symbols (or SC-FDMA symbols) that form a VBRU is indicated by $N_{sym,vir}$, and the number of subcarriers that form a VBRU is indicated by $P_{sc,vir}$. Furthermore, a ratio of symbols (OFDMA or SC-FDMA) included in an OBRU and symbols included in a VBRU is indicated by $K_{sym}$, and a ratio of subcarriers included in an OBRU and subcarriers included in a VBRU is indicated by $K_{sc}$.

In this case, $K_{sym}$ and $K_{sc}$ may be represented as follows.

$$K_{sym} = \frac{N_{sym,vir}}{N_{sym}} = \frac{\text{number of OFDMA (or SC-FDMA) symbols for a VBRU}}{\text{number of OFDMA (or SC-FDMA) symbols for an OBRU}} \quad \text{Equation 1}$$

-continued $$K_{sc} = \frac{N_{sc,vir}}{N_{sc}} = \frac{\text{number of subcarriers per } OFDMA \text{ (or } SC\text{-}FDMA\text{) symbol for a } VBRU}{\text{number of subcarriers per } OFDMA \text{ (or } SC\text{-}FDMA\text{) symbol for a } OBRU}$$ Equation 2

$K_{sym}$ may be represented as in Equation 3. That is, since the number of OFDMA (or SC-FDMA) symbols included depending on the type of subframe varies, $K_{sym}$ may be represented by the number of subframes or slots that is included in one resource unit.

$$K_{sym} = \frac{N_{subf,vir}}{N_{subf}} = \frac{\text{number of subframes (or slots) for a } VBRU}{\text{number of subframes (or slots) for an } OBRU}$$ Equation 3

An embodiment according to the present invention provides a method and apparatus for extending the time domain in which a basic resource unit is transmitted or for extending the frequency domain in which a basic resource unit is transmitted. An example in which the time domain is extended or an example in which the frequency domain is extended may be used at the same time.

The example in which the time domain is extended is first described below. A VBRU used in the example in which the time domain is extended may be called a "time-spanned resource unit". The corresponding unit is transmitted through a plurality of basic resource blocks or a plurality of basic resource units in the time domain.

Figure 11:
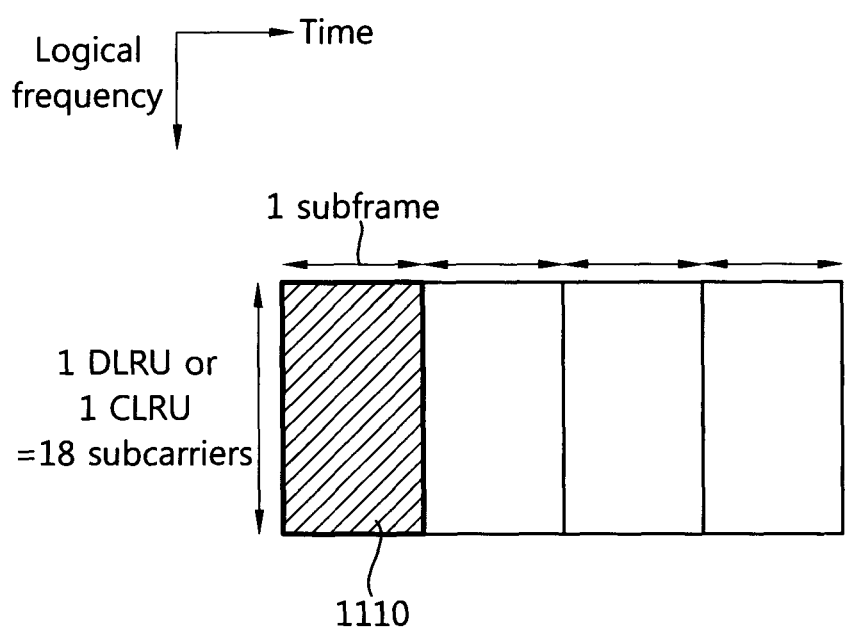
FIG. 11 shows an example of 18 subcarriers and an OBRU transmitted through one subframe in an IEEE 802.16m system.

FIG. 11 shows an example of 18 subcarriers and an OBRU transmitted through one subframe in an IEEE 802.16m system. The one BRU 1110 indicates an OBRU. As shown, the OBRU may be transmitted through a DLRU or a CLRU. The DLRU has Logical Resource Units (LRUs) distributed in the frequency domain, and resources of a 6*6 size may be distributed into three in the frequency domain. The CLRU may be mapped to resources of an 18*6 size that include subcarriers in which LRUs are consecutive. A more detailed description of the DLRU and the CLRU is disclosed in IEEE P802.16 m/D4 "Part 16: Air Interface for Broadband Wireless Access Systems: Advanced Air Interface," February 2010, Section 16.3.5 and 16.3.8. The corresponding contents are incorporated by reference as part of the specification. Some of the following descriptions are based on a DLRU or a CLRU, and the contents of the present embodiment are not limited thereto. It is to be noted that the contents of the present embodiment may be applied to not only a Logical Resource Unit (LRU), but also a Physical Resource Unit (PRU).

Figure 12:
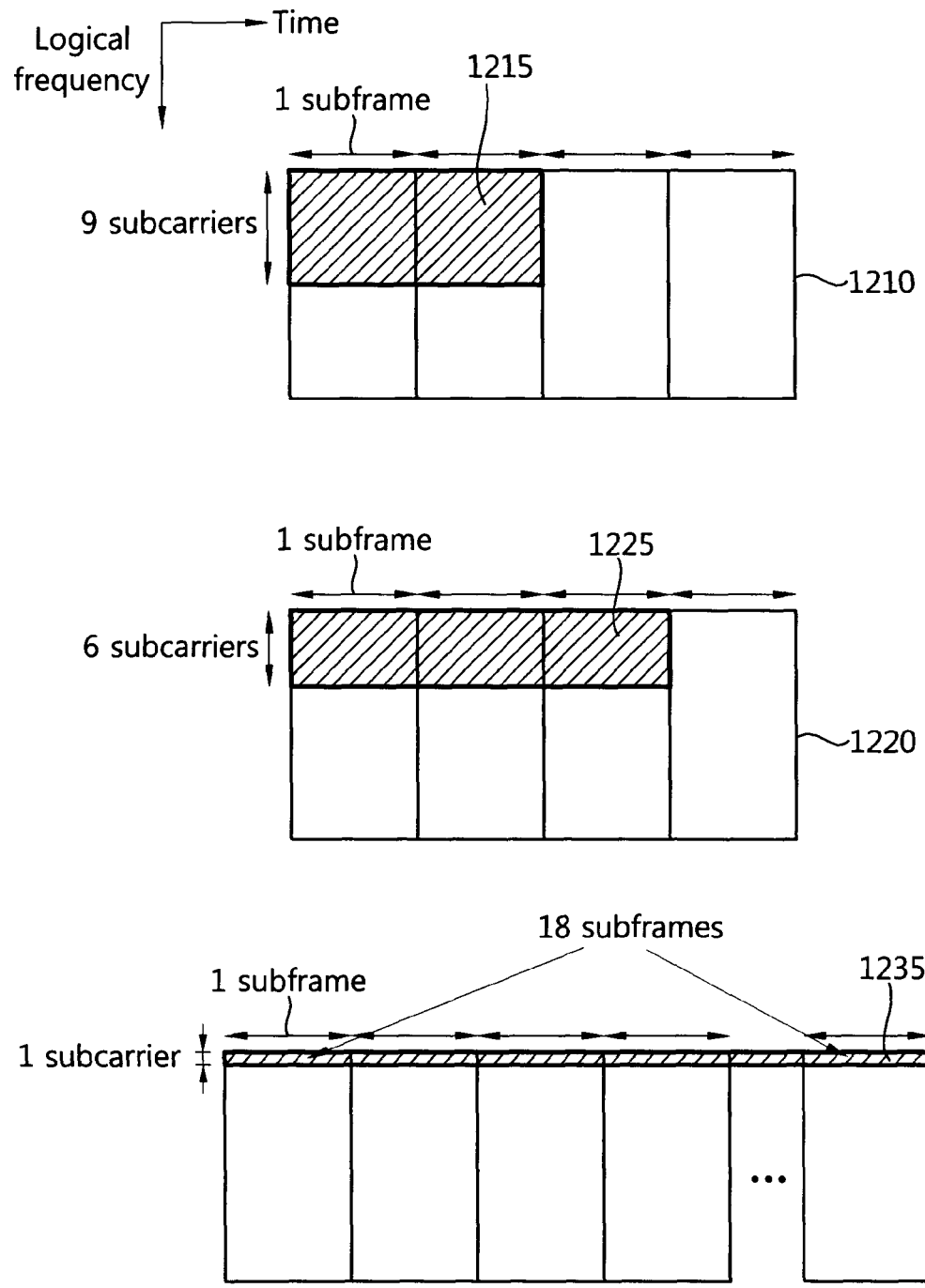
FIG. 12 shows examples of a variety of VBRUs that are generated based on the OBRUs of FIG. 11.

FIG. 12 shows examples of a variety of VBRUs that are generated based on the OBRUs of FIG. 11. In FIG. 12, a first VBRU 1210 is an example in which $$K_{sym} = \frac{2}{1} = 2$$

is established and $$K_{sc} = \frac{9}{18} = 0.5$$

is established. That is, a VBRU that is increased twice in the time domain and is reduced twice in the frequency domain as compared with an OBRU may be used.

In FIG. 12, a second VBRU 1220 is an example in which $$K_{sym} = \frac{3}{1} = 3$$

is established and $$K_{sc} = \frac{6}{18} = \frac{1}{3}$$

is established. That is, a VBRU that is increased three times in the time domain and is reduced three times in the frequency domain as compared with an OBRU may be used.

In FIG. 12, a third VBRU 1230 is an example in which $$K_{sym} = \frac{18}{1} = 18$$

is established and $$K_{sc} = \frac{1}{18} = \frac{1}{18}$$

is established. That is, a VBRU that is increased eighteen times in the time domain and is reduced eighteen times in the frequency domain as compared with an OBRU may be used.

Although not shown in FIG. 12, a VBRU may span the time domain so that it exceeds the number of possible subframes existing in one frame. In this case, signaling overhead can be reduced by providing indexing information about the time span for each frame.

Figure 13:
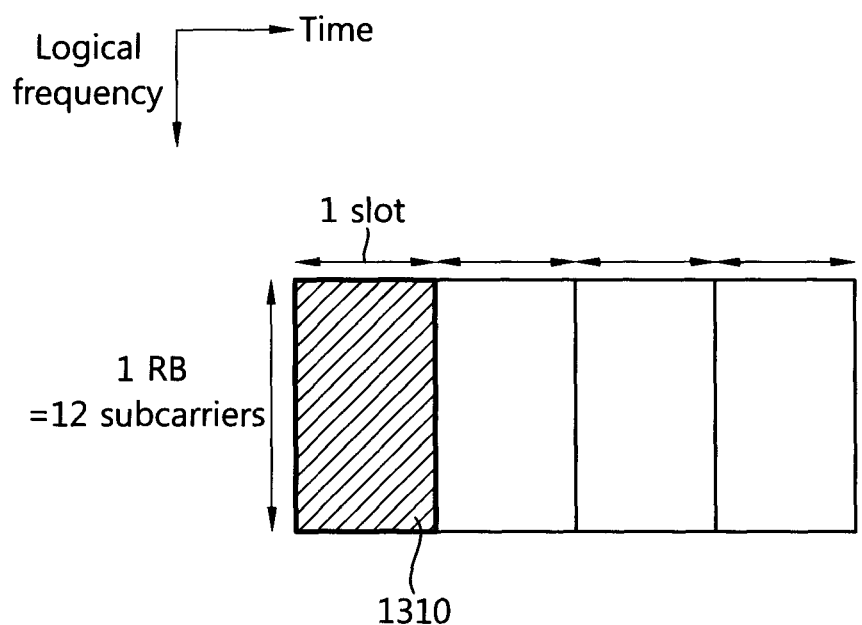
FIG. 13 shows an example of 12 subcarriers and an OBRU transmitted through one slot in a 3GPP LTE system.

FIG. 13 shows an example of 12 subcarriers and an OBRU transmitted through one slot in a 3GPP LTE system. One BRU 1310 illustrated includes an OBRU.

Figure 14:
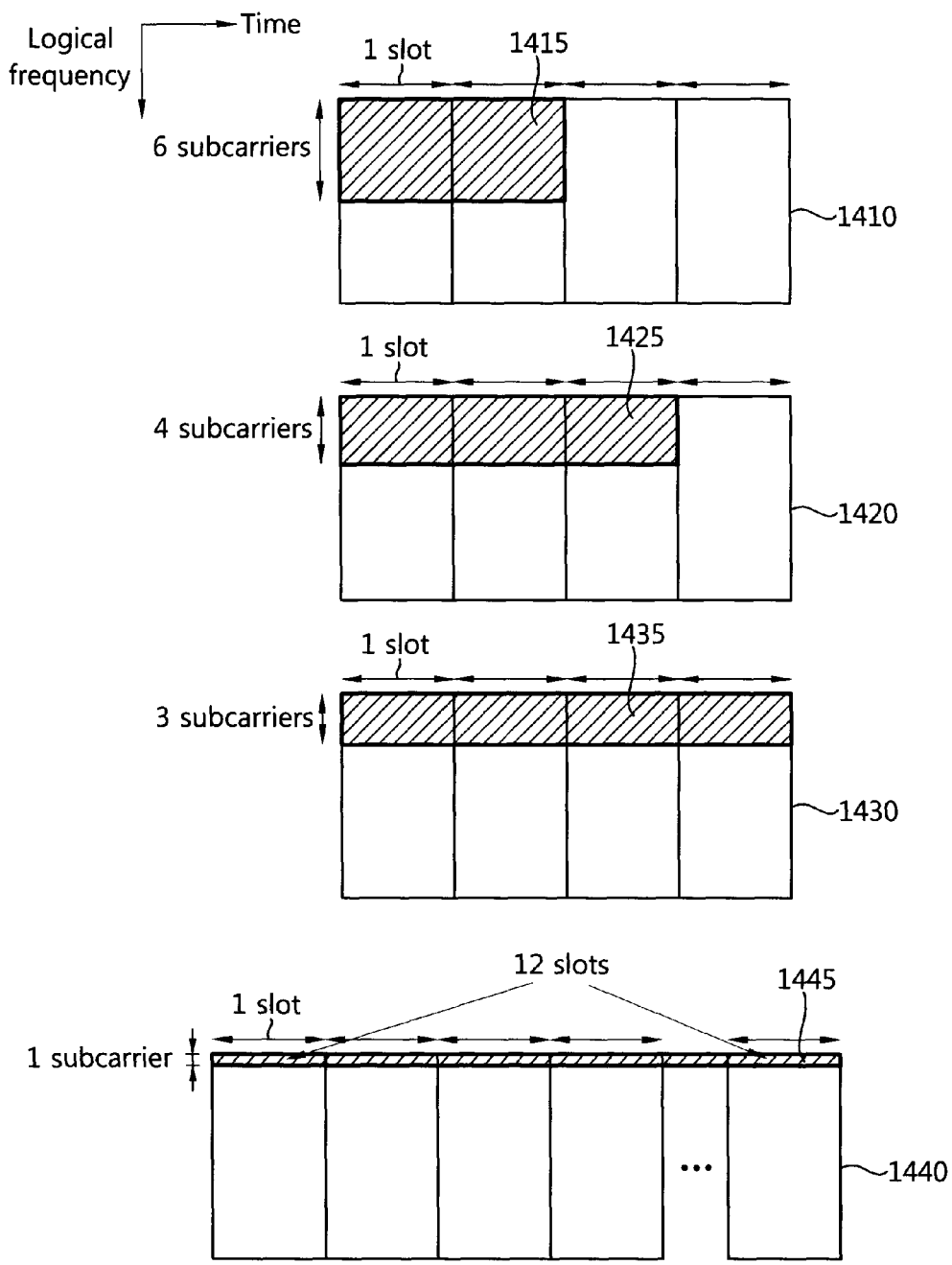
FIG. 14 shows examples of a variety of VBRUs that are generated based on the OBRUs of FIG. 13.

FIG. 14 shows examples of a variety of VBRUs that are generated based on the OBRUs of FIG. 13. In FIG. 14, a first VBRU 1410 is an example in which $$K_{sym} = \frac{2}{1} = 2$$

is established and $$K_{sc} = \frac{9}{18} = 0.5$$

is established. That is, a VBRU that is increased twice in the time domain and is reduced twice in the frequency domain as compared with an OBRU may be used.

In FIG. 14, a second VBRU 1420 is an example in which $$K_{sym} = \frac{3}{1} = 3$$

is established and $$K_{sc} = \frac{6}{18} = \frac{1}{3}$$

is established. That is, a VBRU that is increased three times in the time domain and is reduced three times in the frequency domain as compared with an OBRU may be used.

In FIG. 14, a third VBRU 1430 is an example in which $$K_{sym} = \frac{4}{1} = 4$$

is established and $$K_{sc} = \frac{3}{12} = \frac{1}{4}$$

is established. That is, a VBRU that is increased four times in the time domain and is reduced four times in the frequency domain as compared with an OBRU may be used.

In FIG. 14, a fourth VBRU 1440 is an example in which $$K_{sym} = \frac{12}{1} = 12$$

is established and $$K_{sc} = \frac{1}{12}$$

is established. That is, a VBRU that is increased twelfth times in the time domain and is reduced twelfth times in the frequency domain as compared with an OBRU may be used.

Although not shown in FIG. 12, a VBRU may span the time domain so that it exceeds the number of possible subframes existing in one frame. In this case, signaling overhead can be reduced by providing indexing information about the time span for each frame.

In an LTE system, it is advantageous that the number of subcarriers and the number of slots in which a VBRU is transmitted are determined by (12, 1), (6, 2), (3, 4), (4, 3), or (1, 12) because one subframe includes two slots. That is, VBRUs having a variety of sizes are possible, but communication can be performed using only (12, 1), (6, 2), (3, 4), (4, 3), or (1, 12) in systems according to an LTE standard.

Furthermore, in an LTE system, a VBRU can be extended on the basis of the OBRU of FIG. 13 and a VBRU can also be generated on the basis of an OBRU including 12 subcarriers and one subframe (two slots).

The product of $K_{sym}$ and $K_{sc}$ according to the above-described examples of a VBRU is determined to be 1. However, the product of $K_{sym}$ and $K_{sc}$ may be determined in various ways. For example, the product of $K_{sym}$ and $K_{sc}$ may exceed 1. In this case, since there may be a loss of performance when the existing coding rate is used, the coding rate may be determined by reducing $K_{sym}$ and $K_{sc}$ or a new coding rate may be determined, but the existing coding rate may be used without change.

If the product of $K_{sym}$ and $K_{sc}$ according to the above-described examples of a VBRU is determined to be 1, there is an advantage in that the existing coding and modulation schemes are applicable without change. A coding rate may also be optimized depending on the deployment of a pilot.

The above-described VBRU may be freely multiplexed with an OBRU and allocated. That is, the VBRUs having a variety of sizes proposed in the above-described examples may be used only in specific radio resources (a specific frequency domain or time period). Furthermore, scheduling may be performed on MSs that use VBRUs, and a result of the scheduling may be included in a result of scheduling on MSs that use the existing OBRUs. Furthermore, scheduling may be performed in such a manner that the VBRU and the existing OBRU coexist using an index. Furthermore, scheduling may be performed so the VBRU overlaps with or does not overlap with the existing OBRU.

Examples in which VBRUs having a variety of sizes are allocated are described below.

Figure 15:
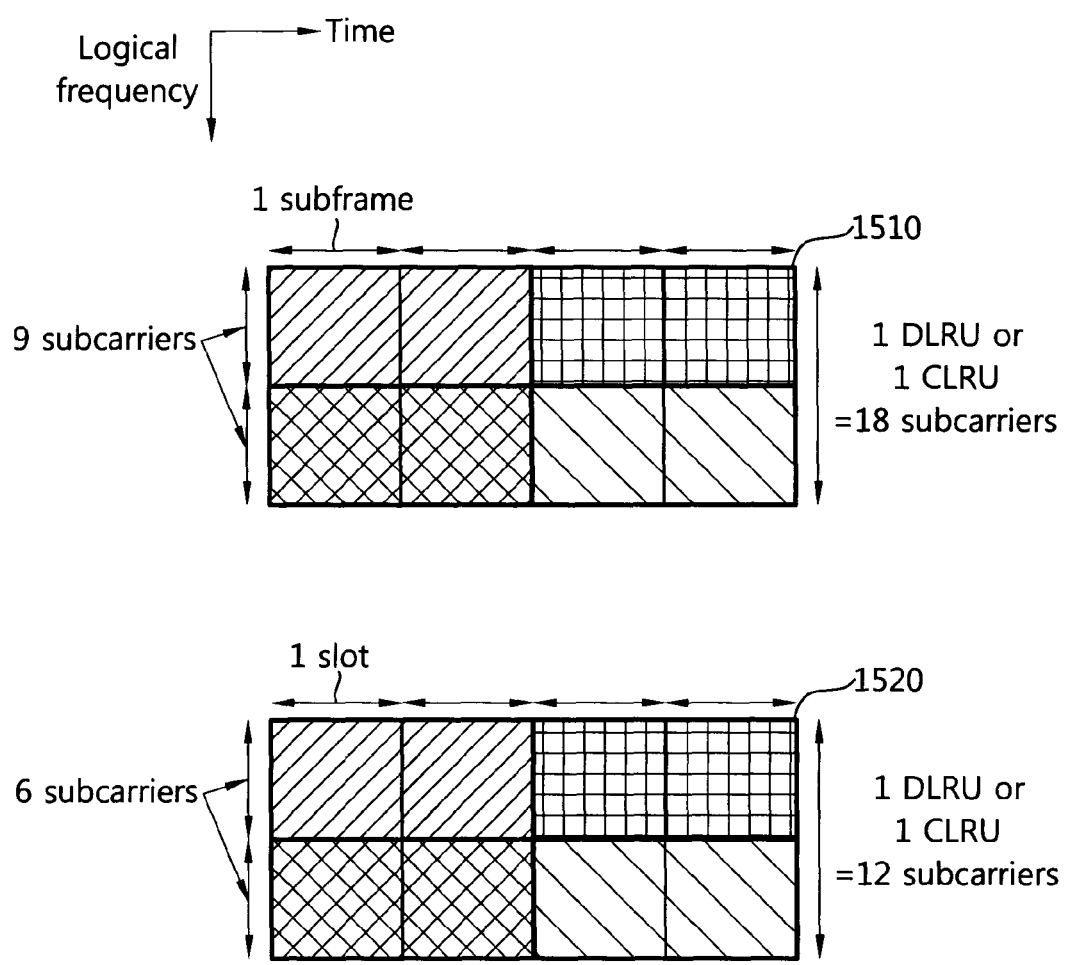
FIG. 15 shows an example in which a VBRU having a fixed size is allocated in the frequency domain.

FIG. 15 shows an example in which a VBRU having a fixed size is allocated in the frequency domain. A first example 1510 of FIG. 15 may be an IEEE 802.16m system, and a second example 1520 thereof may be an LTE system. Meanwhile as in the first example 1510 of FIG. 15, $$K_{sym} = \frac{2}{1} = 2$$

may be established, and $$K_{sc} = \frac{9}{18} = 0.5$$

may be established. Furthermore, as in the second example 1520 of FIG. 15, $$K_{sym} = \frac{2}{1} = 2$$

may be established and $$K_{sc} = \frac{6}{12} = 0.5$$

may be established.

In the examples of FIG. 15, the product of $K_{sym}$ and $K_{sc}$ is determined to be 1. In this case, there is an advantage in that a coding scheme or a modulation scheme used in an OBRU can also be used in a VBRU without change. Meanwhile, a coding rate may be changed depending on the deployment of a pilot.

If a variety of VBRUs are used in accordance with the above-described examples, a variety of the VBRUs may be extended/reduced in a logical domain and may be extended/reduced in a physical domain when they are extended/reduced in the time or frequency domain. That is, resources with which VBRUs span may be contiguous or discontiguous. Furthermore, a region where VBRUs span may be limited to only a subband, a miniband, a CLRU, or a DLRU in order to reduce signaling overhead.

Figure 16:
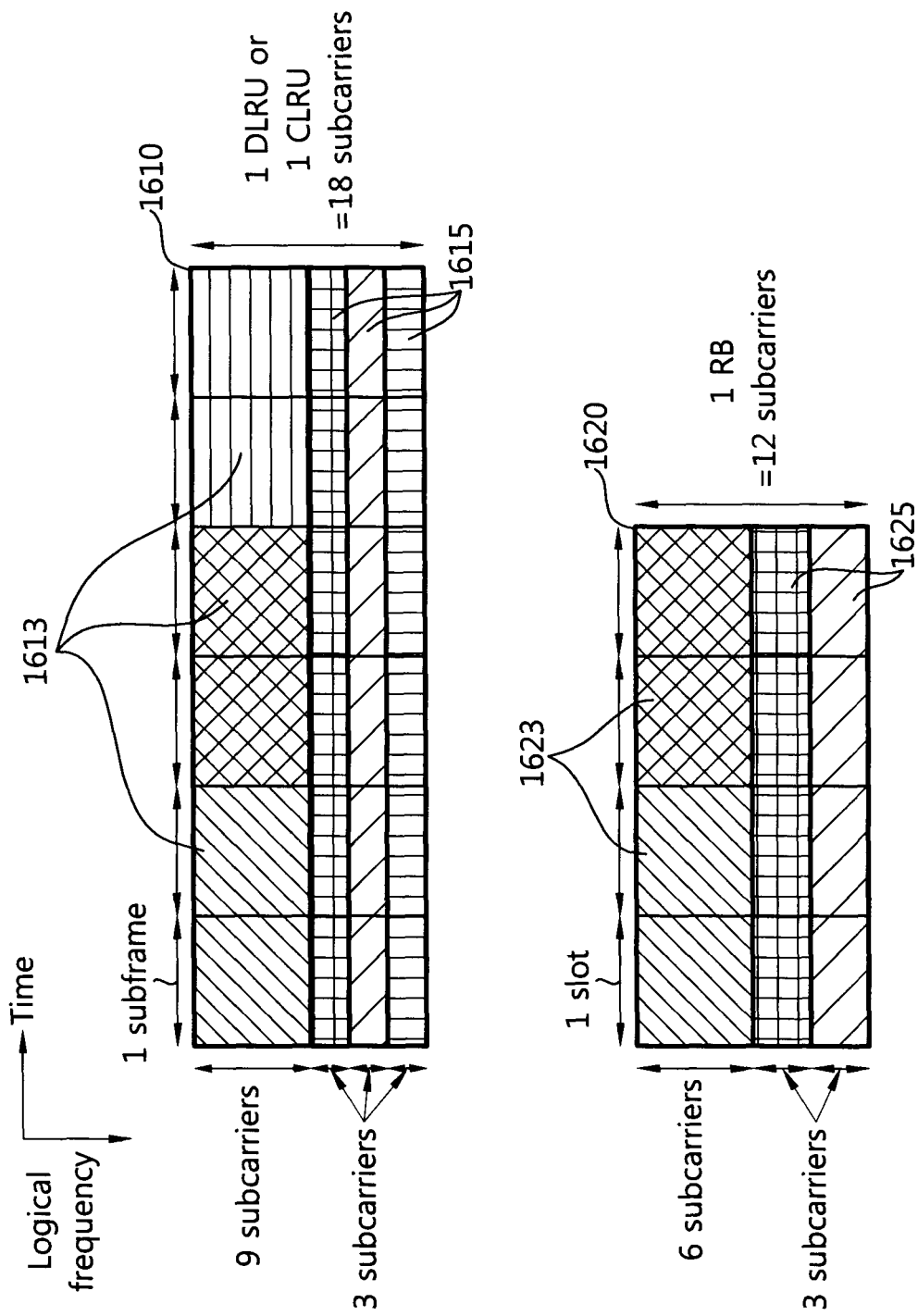
FIG. 16 shows an example in which VBRUs having a variety of variable sizes are allocated.

FIG. 16 shows an example in which VBRUs having a variety of variable sizes are allocated. A first example 1610 of FIG. 16 may be an IEEE 802.16m system, and a second example 1620 thereof may be an LTE system. Meanwhile, in the first example 1610 of FIG. 16, a first case where $$K_{sym} = \frac{2}{1} = 2 \text{ and } K_{sc} = \frac{9}{18} = 0.5$$

and a second case where $$K_{sym} = \frac{6}{1} = 6 \text{ and } K_{sc} = \frac{3}{18} = \frac{1}{6}$$

may be used at the same time. In the first example 1610 of FIG. 16, the product of $K_{sym}$ and $K_{sc}$ is determined to be 1. In this case, there is an advantage in that a coding scheme or a modulation scheme used in an OBRU can also be used in a VBRU without change. Meanwhile, a coding rate may be changed depending on the deployment of a pilot.

In the second example 1620 of FIG. 16, a first case where $$K_{sym} = \frac{2}{1} = 2 \text{ and } K_{sc} = \frac{9}{18} = 0.5$$

and a second case where $$K_{sym} = \frac{4}{1} = 4 \text{ and } K_{sc} = \frac{3}{12} = \frac{1}{4}$$

may be used at the same time. In the second example 1620 of FIG. 16, the product of $K_{sym}$ and $K_{sc}$ is determined to be 1. In this case, there is an advantage in that a coding scheme or a modulation scheme used in an OBRU can also be used in a VBRU without change. Meanwhile, a coding rate may be changed depending on the deployment of a pilot.

In the examples of FIG. 16, the allocation of resources has been performed in unit of a plurality of VBRUs generated from one OBRU and configured to have different K values ($K_{sym}$, $K_{sc}$, etc.). However, other examples are also possible. That is, although a plurality of VBRUs having different K values is used, only a VBRU corresponding to one K value may be used within one OBRU.

In the examples of FIG. 16, a point of time at which a VBRU 1613, 1623 of a first type is ended is not identical with a point of time at which a VBRU 1615, 1625 of a second type is ended. This is not a problem if the scheduling period is controlled. For example, a BS may schedule the first type every four subframes and may schedule the second type every three subframes. Meanwhile, in order to use only a VBRU (i.e., a VBRU having six subcarriers) from a subsequent subframe (a fifth slot subsequent to the frame 1620), scheduling on a VBRU (i.e., a VBRU having three subcarriers) of the remaining type in a fourth slot may not be performed.

In accordance with the above-described examples, if a VBRU is generated by modifying an OBRU, the size of radio resources corresponding to a VBRU is determined to be identical with the size radio resources of an OBRU (i.e., the total amount of radio resources). That is, if reduction (or expansion) is performed by x times in the frequency domain, reduction (or expansion) is performed by x times in the time domain. The size of radio resources corresponding to a VBRU may differ from an OBRU, that is, a basis of the VBRU. This example of a VBRU is described with reference to FIG. 17.

Figure 17:
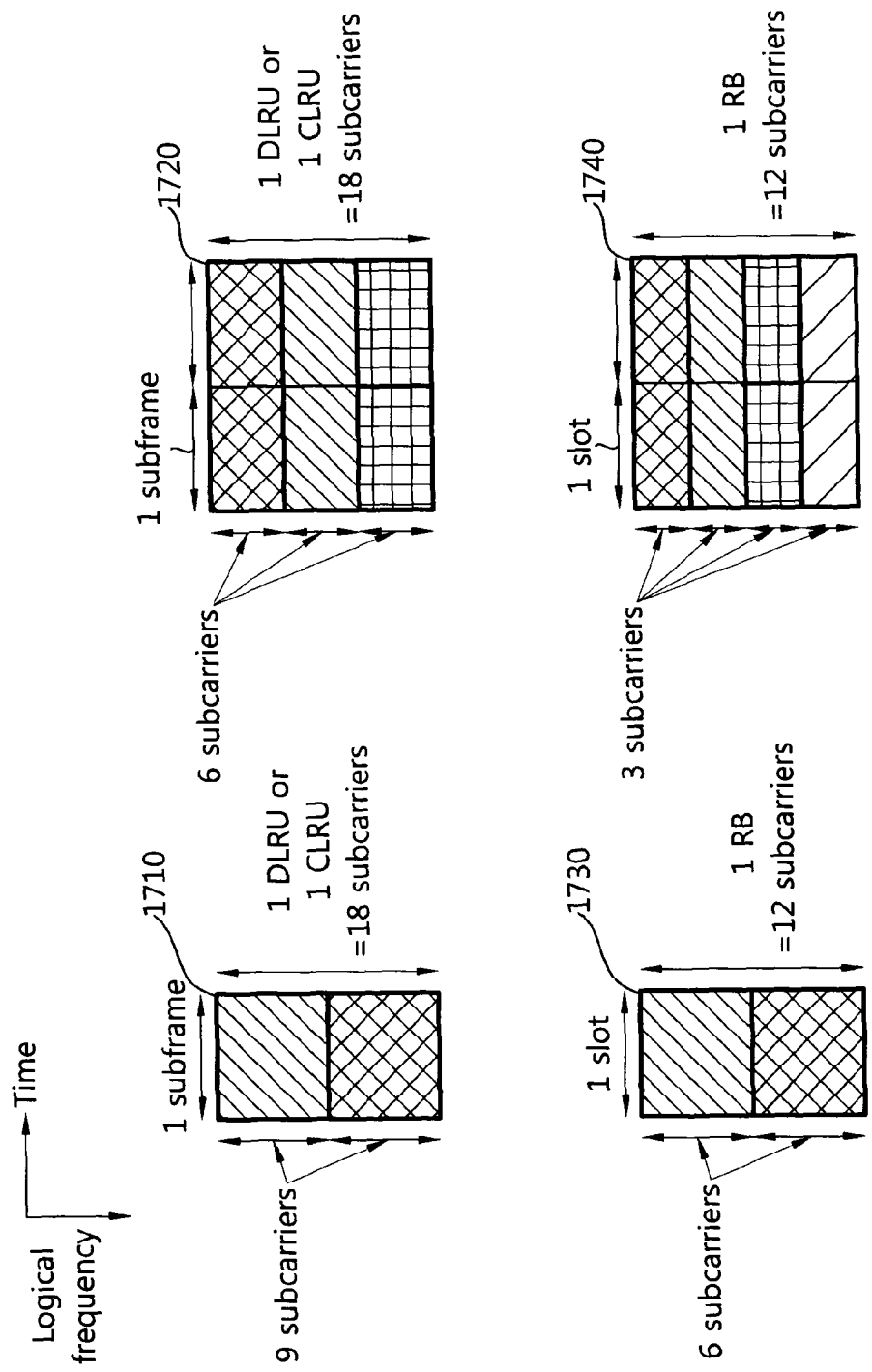
FIG. 17 shows an example in which a VBRU including a smaller number of subcarriers than an OBRU is used.

FIG. 17 shows an example in which a VBRU including a smaller number of subcarriers than an OBRU is used. In the example of FIG. 17, an OBRU is expanded x times and reduced y times in the frequency domain. The example of FIG. 17 may be usefully utilized in a communication scheme that uses a small amount of data, such as metering. More particularly, the VBRU used in FIG. 17 may use a small amount of radio resources than an OBRU.

Each of a first example 1710 and a second example 1720 of FIG. 17 may be an IEEE 802.16m system, and each of a third example 1730 and a fourth example 1740 thereof may be an LTE system. Meanwhile, in the first example 1710 and the third example 1730 of FIG. 17, the case where $$K_{sym} = \frac{1}{1} = 1$$

and $$K_{sc} = \frac{9}{18} \text{ or } \frac{6}{12} = 0.5$$

may be used. In the first example 1710 and the third example 1730 of FIG. 17, the product of $K_{sym}$ and $K_{sc}$ is not maintained to be 1. That is, an increase is performed one time in the time domain, but a reduction is performed twice in the frequency domain.

In the second example 1720 of FIG. 17, the case where $$K_{sym} = \frac{2}{1} = 2$$

and $$K_{sc} = \frac{6}{18} = \frac{1}{3}$$

may be used. In the second example of FIG. 17, an increase is performed twice in the time domain, and a reduction is performed three times in the frequency domain.

In the fourth example 1740 of FIG. 17, the case where $$K_{sym} = \frac{2}{1} = 2 \text{ and } K_{sc} = \frac{3}{12} = \frac{1}{4}$$

may be used. In the fourth example of FIG. 17, an increase is performed twice in the time domain, and a reduction is performed four times in the frequency domain.

A scheme for allocating and using resources through a plurality of basic resource blocks or basic resource units in the frequency domain is described below.

Figure 18:
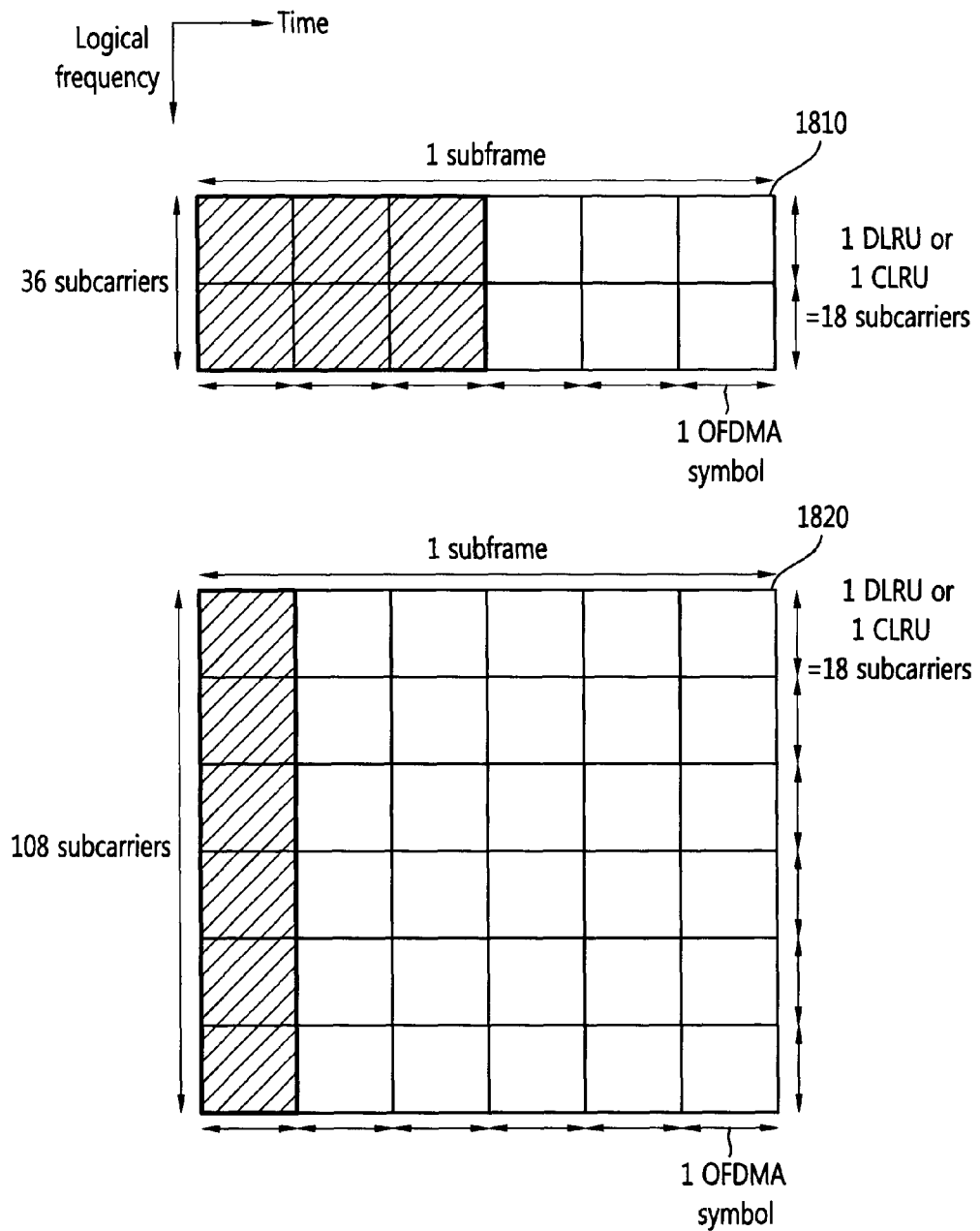
FIG. 18 illustrates a method of generating a VBRU extended in the frequency domain.

FIG. 18 illustrates a method of generating a VBRU extended in the frequency domain. An example of the method of FIG. 18 is an example of the VBRU generated on the basis of the OBRU shown in FIG. 11. In a first example 1810 of FIG. 18, the case where $$K_{sym} = \frac{3}{6} = \frac{1}{2} \text{ and } K_{sc} = \frac{36}{18} = 2$$

may be used. In the first example 1810 of FIG. 18, a reduction is performed twice in the time domain, and an increase is performed twice in the frequency domain. In a second example 1820 of FIG. 18, the case where $$K_{sym} = \frac{1}{6} \text{ and } K_{sc} = \frac{108}{18} = 6$$

may be used. In the second example 1820 of FIG. 18, a reduction is performed six times in the time domain, and an increase is performed six times in the frequency domain.

In the above-described example, expansion/reduction may be performed in a logical domain and may be performed in a physical domain when expansion/reduction are performed in the time or frequency domain. That is, resources with which VBRUs span may be contiguous or discontiguous. Furthermore, a region where VBRUs span may be limited to only a subband, a miniband, a CLRU, or a DLRU in order to reduce signaling overhead.

Figure 19:
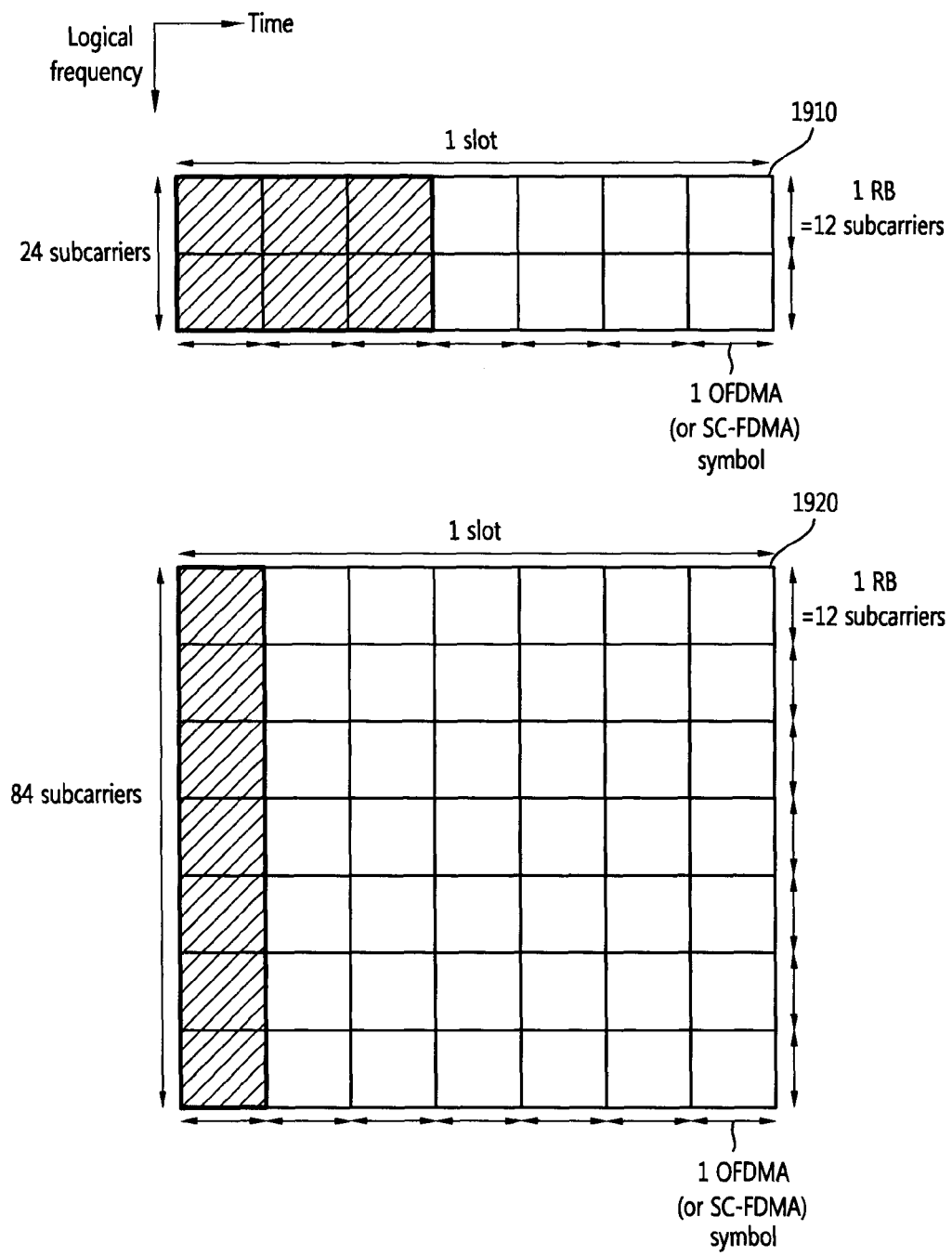
FIG. 19 shows another example of a VBRU extended in the frequency domain.

FIG. 19 shows another example of a VBRU extended in the frequency domain. In a first example 1910 of FIG. 19, the case where $$K_{sym} = \frac{3}{7} \left( \text{or } K_{sym} = \frac{1/2 \text{ slot}}{1 \text{ slot}} = \frac{1}{2} \right) \text{ and } K_{sc} = \frac{24}{12} = 2$$

may be used. In the first example 1910 of FIG. 19, a reduction is performed 3/7 times in the time domain, but an increase is performed 2 (=floor(7/3)) times in the frequency domain. In a second example 1920 of FIG. 19, the case where $$K_{sym} = \frac{1}{7} \text{ and } K_{sc} = \frac{84}{12} = 7$$

may be used. In the second example 1920 of FIG. 19, a reduction is performed seven times in the time domain, but an increase is performed seven times in the frequency domain.

The product of $K_{sym}$ and $K_{sc}$ according the above-described example of the VBRU may be freely determined. If the product of $K_{sym}$ and $K_{sc}$ is determined to be 1, there is an advantage in that the existing coding and modulation schemes are applicable without change. A coding rate may also be optimized depending on the deployment of a pilot.

The above-described VBRU may be freely multiplexed with an OBRU and allocated. That is, the VBRUs having a variety of sizes proposed in the above-described examples may be used only in specific radio resources (a specific frequency domain or time period). Furthermore, scheduling may be performed on MSs that use VBRUs, and a result of the scheduling may be included in a result of scheduling on MSs that use the existing OBRUs. Furthermore, scheduling may be performed in such a manner that the VBRU and the existing OBRU coexist using an index. Furthermore, scheduling may be performed so the VBRU overlaps with or does not overlap with the existing OBRU.

Detailed examples in which radio resources are allocated on the basis of the above-described VRBU are described below.

FIG. 20 is an example in which radio resources are allocated based on a VBRU that occupies a fixed size in the time domain. That is, in the example of FIG. 20, a VBRU having a fixed size is used in the time domain. In a first example 2010 of FIG. 20, the case where $$K_{sym} = \frac{3}{6} = \frac{1}{2} \text{ and } K_{sc} = \frac{36}{18} = 2$$

may be used. In a second example 2020 of FIG. 20, the case where $$K_{sym} = \frac{3}{7} \left( \text{or } K_{sym} = \frac{1/2 \text{ slot}}{1 \text{ slot}} = \frac{1}{2} \right) \text{ and } K_{sc} = \frac{6}{12} = \frac{1}{2}$$

may be used. The product of $K_{sym}$ and $K_{sc}$ according to the above-described example of the VBRU may be freely determined. If the product of $K_{sym}$ and $K_{sc}$ is determined to be 1, there is an advantage in that the existing coding and modulation schemes are applicable without change. A coding rate may also be optimized depending on the deployment of a pilot. The VBRU used in the example of FIG. 20 is reduced twice in the time domain, but is increased twice in the frequency domain as compared with an OBRU.

Figure 21:
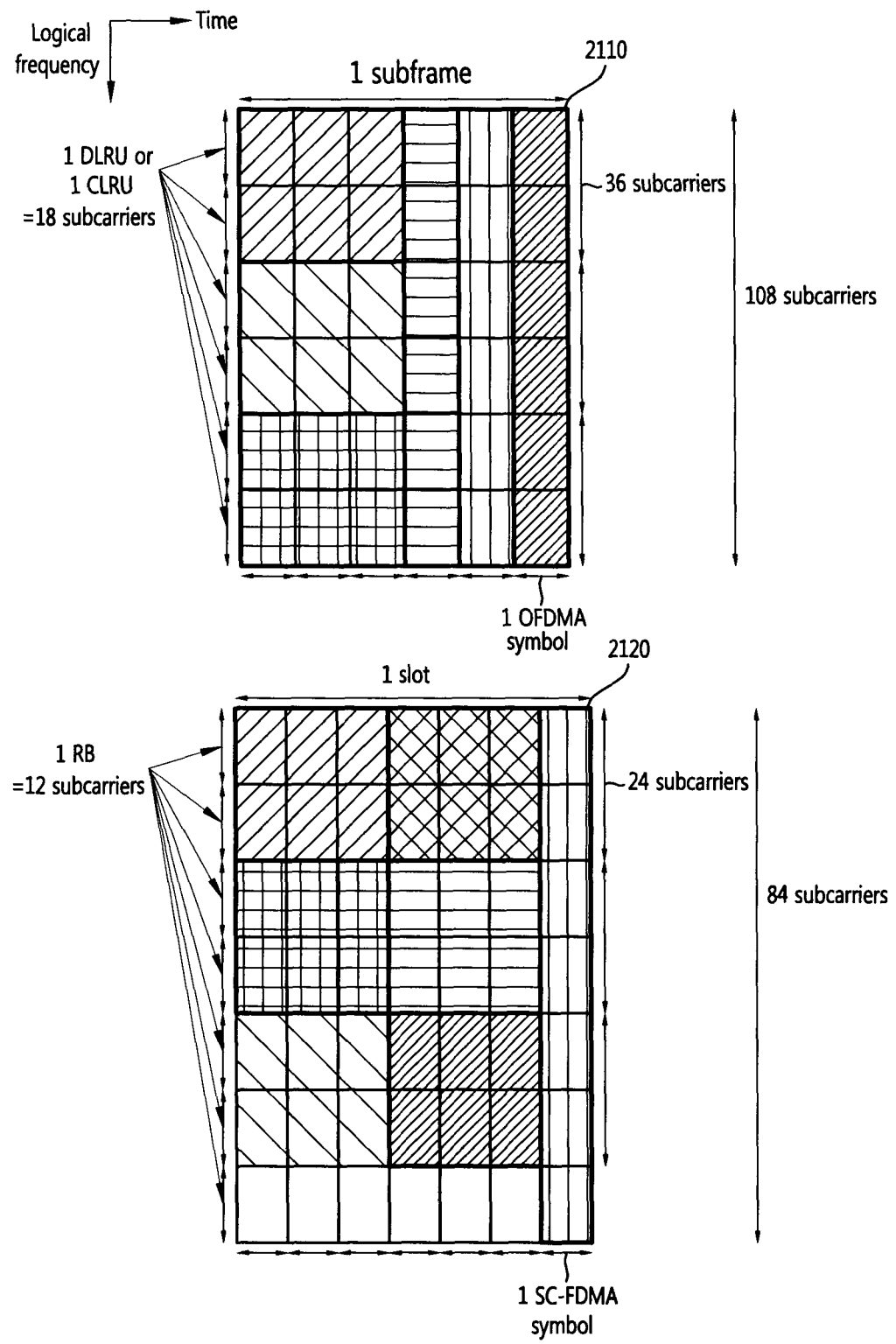
FIG. 21 is another example in which radio resources are allocated based on a VBRU.

The first example 2010 of FIG. 20 may be an example in accordance with IEEE 802.16m, and the second example 2020 thereof may be a system in accordance with LTE. In the case of an LTE system, it may be difficult to reduce resources in the time domain because the number of subframes included in one slot is odd. Thus, an OBRU may be determined on the basis of two slots, and a VBRU may be generated from the OBRU FIG. 21 is another example in which radio resources are allocated based on a VBRU. In a first example 2110 of FIG. 21, a first case where $$K_{sym} = \frac{3}{6} = \frac{1}{2} \text{ and } K_{sc} = \frac{36}{18} = 2$$

and a second case where $$K_{sym} = \frac{1}{6} \text{ and } K_{sc} = \frac{18*6}{18} = 6$$

may be used at the same time. In this case, the product of $K_{sym}$ and $K_{sc}$ may be determined to be 1. If the product of $K_{sym}$ and $K_{sc}$ is determined to be 1, there is an advantage in that the existing coding and modulation schemes are applicable without change. A coding rate may also be optimized depending on the deployment of a pilot. The VBRU used in the first example 2110 of FIG. 21 is reduced twice (or six times) in the time domain, but is reduced twice (or six times) in the frequency domain as compared with an OBRU. Meanwhile, the first example 2110 of FIG. 21 may be an example in accordance with IEEE 802.16m.

In the second example 2120 of FIG. 21, a first case where $$K_{sym} = \frac{3}{7} \left( \text{or } K_{sym} = \frac{1/2 \text{ slot}}{1 \text{ slot}} = \frac{1}{2} \right) \text{ and } K_{sc} = \frac{12}{24} = \frac{1}{2}$$

and a second case where $$K_{sym} = \frac{1}{7} \text{ and } K_{sc} = \frac{12*7}{12} = 7$$

may be used at the same time. The product of $K_{sym}$ and $K_{sc}$ may be freely determined. If the product of $K_{sym}$ and $K_{sc}$ is determined to be 1, there is an advantage in that the existing coding and modulation schemes are applicable without change. The coding rate may be optimized depending on the deployment of a pilot. The VBRU used in the first example 2120 of FIG. 21 is reduced twice (or seven times) in the time domain, but is reduced twice (or seven times) in the frequency domain as compared with an OBRU. In the examples of FIG. 21, the allocation of resources has been performed in unit of a plurality of VBRUs generated from one OBRU and configured to have different K values ($K_{sym}$, $K_{sc}$, etc.). However, other examples are also possible. That is, although a plurality of VBRUs having different K values is used, only a VBRU corresponding to one K value may be used within one OBRU. Meanwhile, the second example 2120 of FIG. 21 may be an example in accordance with LTE.

In the example of FIG. 21, points of time at which the VBRUs of different types are ended may not be identical with each other, but this is not a problem if a scheduling period is controlled. Meanwhile, if there is an empty space in some resources while different VBRUs are allocated, additional VBRUs may be allocated.

If a VBRU is generated by modifying an OBRU, the size of radio resources (e.g., the number of tones) corresponding to the VBRU is identical with or different from the size of radio resources of the OBRU. An example in which the size of radio resources corresponding to a VBRU is determined differently from an OBRU, that is, a basis of the VBRU, is described with reference to FIG. 22.

Figure 22:
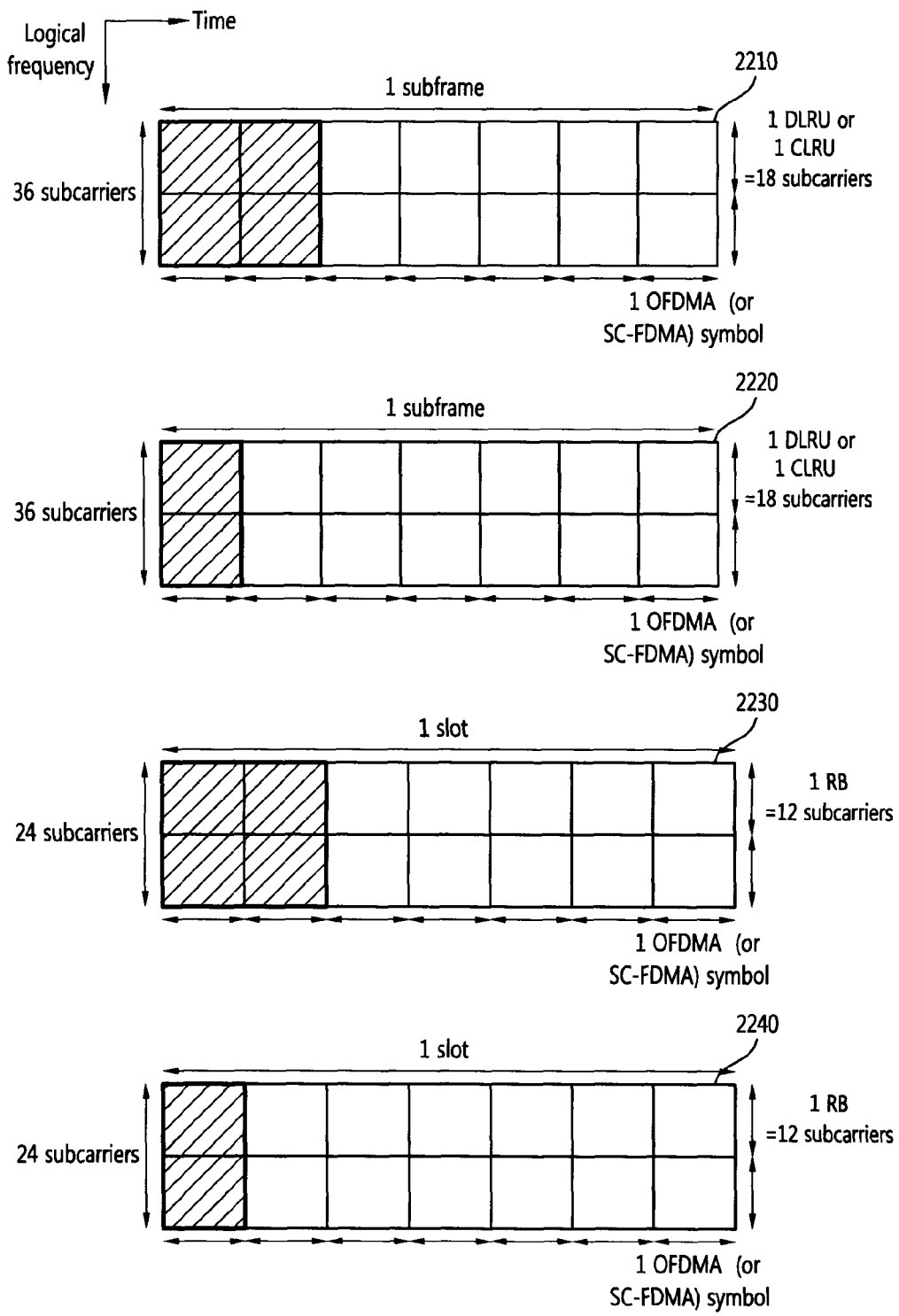
FIG. 22 shows an example in which a VBRU including a smaller number of subcarriers than an OBRU is used.

FIG. 22 shows an example in which a VBRU including a smaller number of subcarriers than an OBRU is used. In the example of FIG. 22, an OBRU is expanded x times and is reduced y times in the frequency domain. The example of FIG. 22 may be usefully utilized in a communication scheme that uses a small amount o data, such as metering. More particularly, the VBRU used in FIG. 22 may use radio resources smaller than an OBRU.

Each of a first example 2210 and a second example 2220 of FIG. 22 may be an IEEE 802.16m system, and each of a third example 2230 and a fourth example 2240 may be an LTE system. Meanwhile, in the first example 2210 of FIG. 22, the case where $$K_{sym} = \frac{2}{6} = \frac{1}{3} \text{ and } K_{sc} = \frac{36}{18} = 2$$

may be used. In the first example 2210 of FIG. 22, the product of $K_{sym}$ and $K_{sc}$ is not maintained to be 1. That is, an increase is performed twice in the frequency domain, but a reduction is performed three times in the time domain.

In the second example 2220 of FIG. 22, the case where $$K_{sym} = \frac{1}{6} \text{ and } K_{sc} = \frac{36}{18} = 2$$

may be used. In the second example 2220 of FIG. 22, the product of $K_{sym}$ and $K_{sc}$ is not maintained to be 1. That is, an increase is performed twice in the frequency domain, but a reduction is performed six times in the time domain. Furthermore, in the third example 2230 of FIG. 22, the case where $$K_{sym} = \frac{2}{7} \text{ and } K_{sc} = \frac{24}{12} = 2$$

may be used. In the third example 2230 of FIG. 22, the product of $K_{sym}$ and $K_{sc}$ is not maintained to be 1. That is, an increase is performed twice in the frequency domain, and a reduction is performed 7/2 times in the time domain. Furthermore, in the fourth example 2240 of FIG. 22, the case where $$K_{sym} = \frac{1}{7} \text{ and } K_{sc} = \frac{24}{12} = 2$$

may be used. In the fourth example 2240 of FIG. 22, the product of $K_{sym}$ and $K_{sc}$ is not maintained to be 1. That is, an increase is performed twice in the frequency domain, and a reduction is performed seven times in the time domain.

Figure 23:
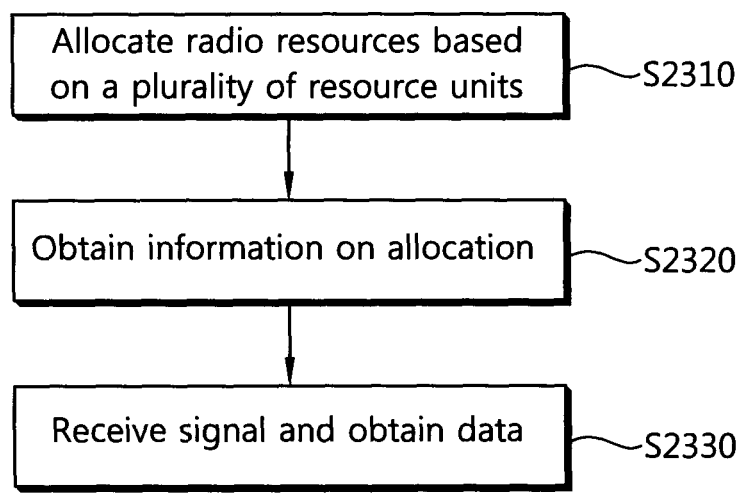
FIG. 23 shows an example in which communication is performed using a variety of BRUs.
Figure 24:
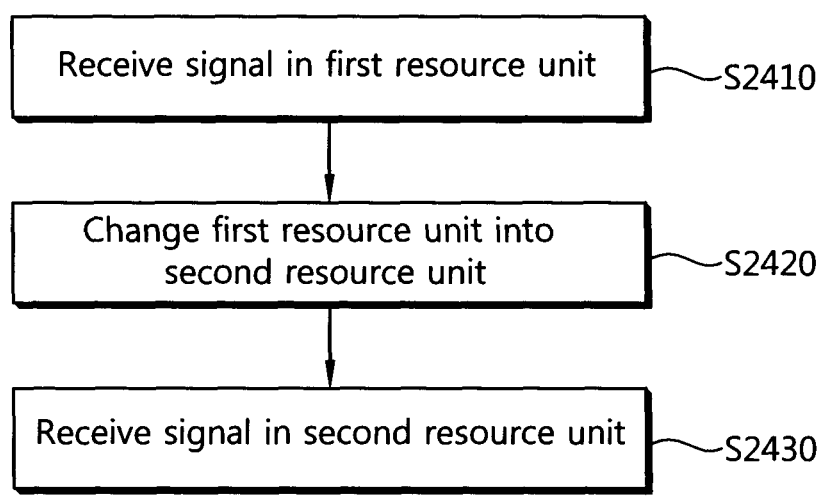
FIG. 24 shows another example in which communication is performed using a variety of BRUs.

FIGS. 23 to 24 show examples in which communication is performed using a variety of resource units. The resource unit includes the above-described OBRU and VBRU. In accordance with FIG. 23, an apparatus (e.g., a BS and an MS) according to the present invention allocates radio resources on the basis of a plurality of resource units (S2310). In this case, the plurality of resource units may be used for data for a plurality of MSs. For example, if first data for a first MS and second data for a second MS are allocated, the first data may be allocated on the basis of a first resource unit corresponding to the first MS and the second data may be allocated on the basis of a second resource unit corresponding to the second MS.

A plurality of resource units may correspond to frequency-time resources of different regions. For example, if the first resource unit includes 18 subcarriers and one subframe, the second resource unit may include frequency-time resources (e.g., 9 subcarriers and two subframes) of a different region.

The total amount of frequency-time resources included in each of the plurality of resource units may be the same. For example, if a first resource unit includes 18 subcarriers and 1 subframe, a second resource unit may include 9 subcarriers and 2 subframes. Regions corresponding to frequency-time resources that are used in the first resource unit and the second resource unit are different from each other, but the total amount of each of the frequency resources and the time resources (i.e., the number of tones included therein) is determined to be the same.

The apparatus according to the present invention obtains information on allocation performed at S2310 (S2320). The corresponding information may be transferred in accordance with a variety of signaling schemes. When the information on the allocation is obtained, a signal can be received and data can be obtained based on the obtained information (S2330).

In accordance with FIG. 24, the apparatus (e.g., an MS or a BS) according to the above-described embodiment may receive a signal through a first resource unit (S2410). Next, the first resource unit may be changed into a second resource unit (S2420). For example, the first resource unit may be an OBRU, and the second resource unit may be a VBRU. Or, the first resource unit may be the above-described VBRU, and the second resource unit may be a VBRU different from the first resource unit. Or, the first resource unit may be a VBRU, and the second resource unit may be an OBRU. If a resource unit is changed, it is informed that the resource unit has been changed through a variety of signaling schemes. Next, a signal is received through the changed second resource unit (S2430).

Pilot patterns are described below. If radio resources are allocated using the above-described VBRU, the radio resources can be allocated without changing a conventional pilot pattern. That is, the pilot pattern of an OBRU can be used. If a pilot pattern according to an OBRU is used, it is preferred that a VBRU be generated based on the pilot pattern of the OBRU. An example in which a VBRU is generated based on the pilot pattern of an OBRU is described below.

Figure 25:
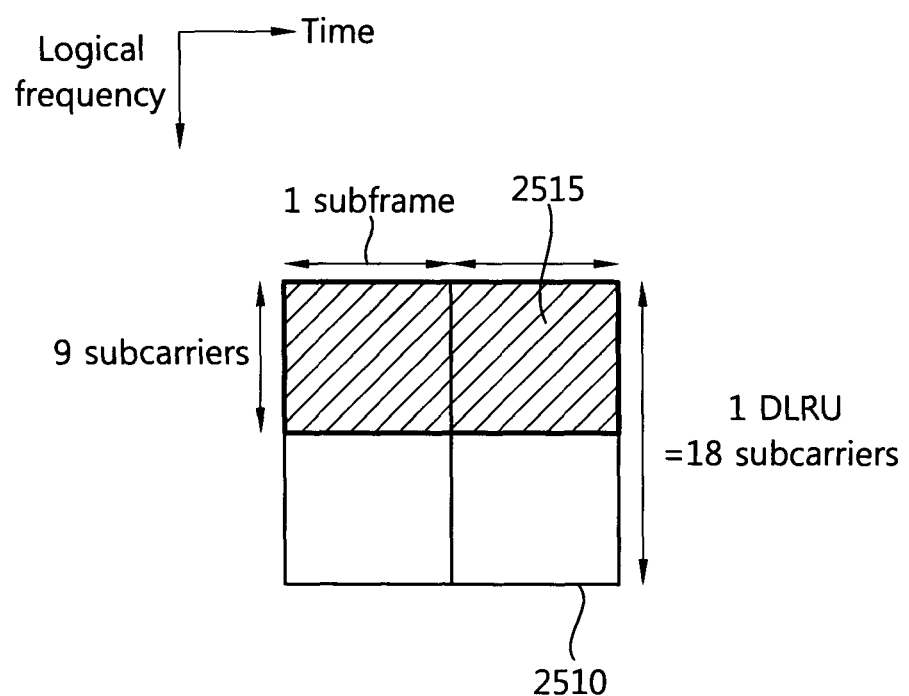
FIG. 25 shows an example of a VBRU in which the frequency domain is reduced by half.
Figure 26:
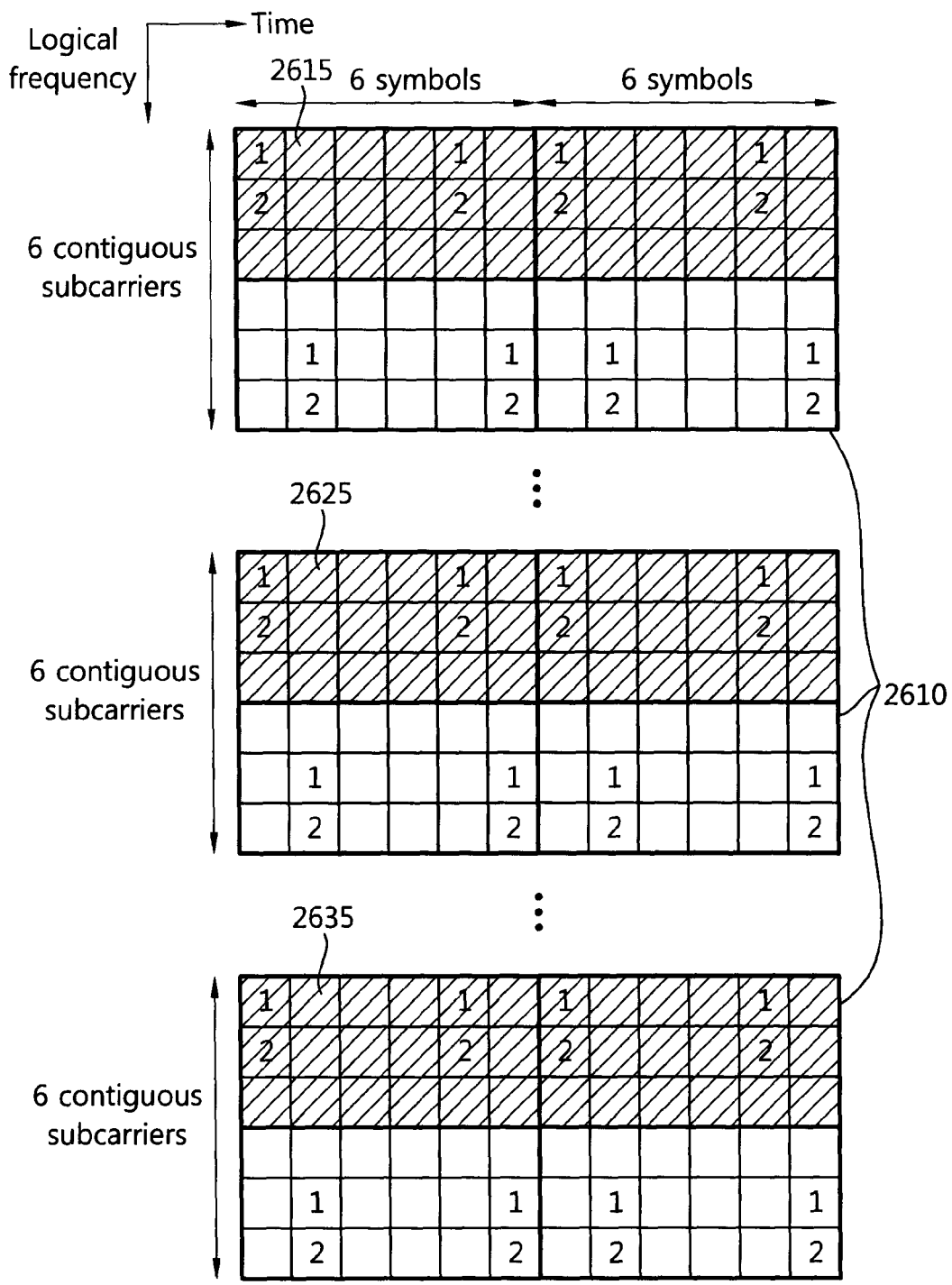
FIG. 26 shows examples in which a VBRU is generated based on the pilot pattern of a conventional DLRU.

FIG. 25 shows an example of a VBRU in which the frequency domain is reduced by half. As shown, one Distributed LRU (DLRU) spans 18 subcarriers, but a VBRU spans 9 subcarriers. In the DLRU, a 6*6 structure including 6 symbols and 6 consecutive subcarriers is repeated three times, and each of the 6*6 structures is distributed. When a VBRU, such as that shown in FIG. 25, is generated, part of the pilot pattern of a conventional DLRU can be used without change. FIG. 26 shows examples in which a VBRU is generated based on the pilot pattern of a conventional DLRU. As shown, a DLRU 2610 has a 6*6 structure and includes a pilot signal for two antennas. In FIG. 26, reference numeral 1 indicates a pilot for a first transmission antenna, and reference numeral 2 indicates a pilot for a second transmission antenna. As shown, VBRUs 2615, 2625, and 2635, such as that shown in FIG. 25, can be generated based on a 3*6 structure that is half the 6*6 structure. In this case, a change in the operation of a system can be minimized because the pilot pattern of the VBRU complies with the pattern of an OBRU without change.

If the example of FIG. 26 is used, a pilot pattern is changed depending on the position where the VBRU is generated. For example, the pilot pattern of a VBRU generated based on an upper 3*6 structure in the 6*6 structure is different from the pilot pattern of a VBRU generated based on a lower 3*6 structure in the 6*6 structure. In order to prevent the pilot patterns from being different from each other, any one of the pilot patterns may be fixed or the pilot patterns may be rotated (i.e., cyclically replaced).

Figure 27:
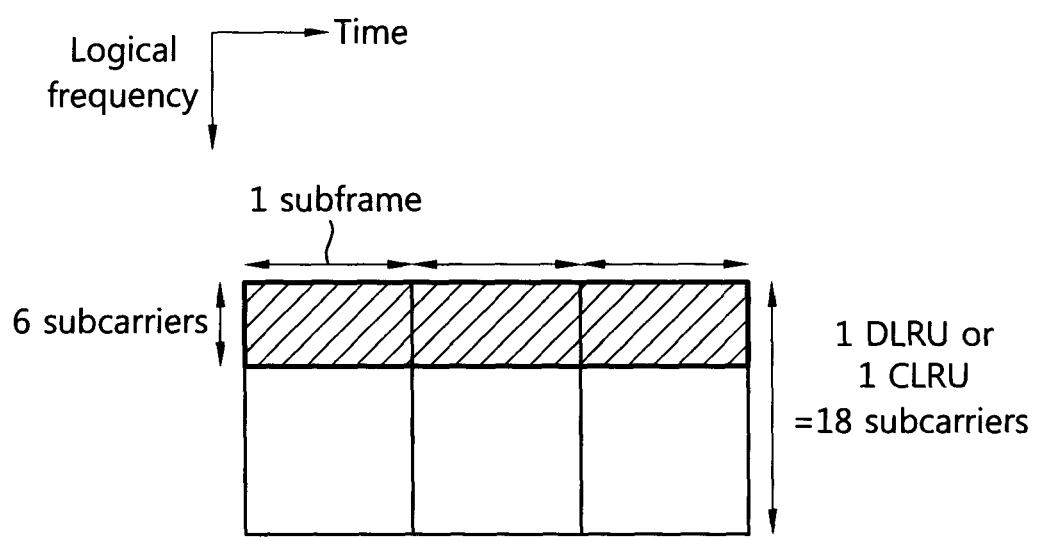
FIG. 27 shows an example of a VBRU in which the frequency domain is reduced one-third.
Figure 28:
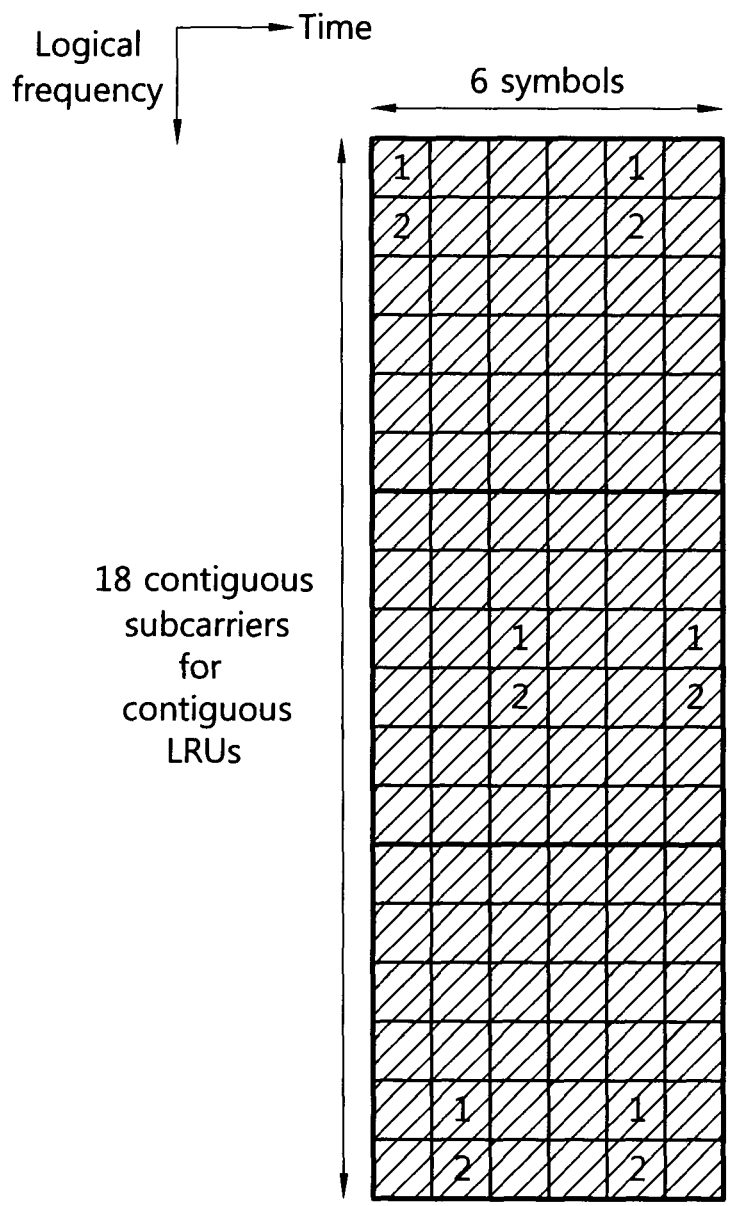
FIG. 28 shows an example of a pilot pattern included in one CLRU.

FIG. 27 shows an example of a VBRU in which the frequency domain is reduced one-third. As described above, one DLRU includes three 6*6 structures, and one Contiguous LRU (CLRU) includes one 18*6 structure. FIG. 28 shows an example of a pilot pattern included in one CLRU. If a VBRU is generated based on one CLRU, part of the pilot pattern according to FIG. 28 may be used without change. That is, a pilot pattern for the VBRU of FIG. 27 may be produced using part of the 18*6 structure shown in FIG. 28. In this case, there is an advantage in that the pilot structure of the VBRU becomes identical with the pilot structure of an OBRU.

If part of the 18*6 structure shown in FIG. 28 is selected, the pilot pattern is changed depending on the position where part of the 18*6 structure is selected. In this case, the pilot pattern may be fixed by part of the 18*6 structure shown in FIG. 28. That is, any one pilot pattern of the top, middle, and bottom of the 18*6 structure of FIG. 28 may be fixed as a pilot pattern for a VBRU.

Figure 29:
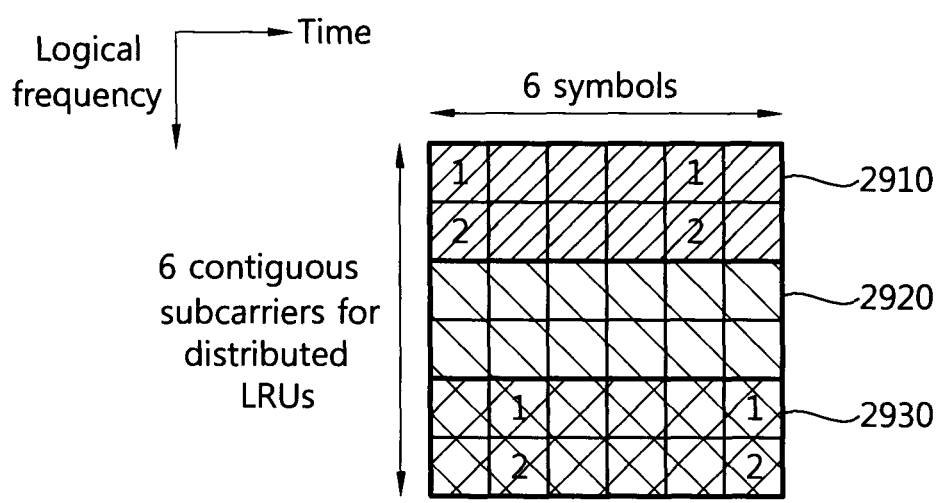
FIG. 29 shows an example of a pilot pattern included in one DLRU.

FIG. 29 shows an example of a pilot pattern included in one DLRU. As shown, pilot signals are included in an upper 2*6 structure 2910 or a lower 2*6 structure 2930. If a VBRU, such as that shown in FIG. 27, is generated, the upper 2*6 structure 2910 or the lower 2*6 structure 2930 of FIG. 29 may be used. If part of the structure of FIG. 29 is used without change, problems due to a change of a pilot pattern at the time of channel estimation are minimized because the same pilot pattern as the pilot pattern of an OBRU is used.

If part of the 2*6 structure shown in FIG. 29 is selected, a pilot pattern is changed depending on the position where part of the 2*6 structure is selected. In this case, the pilot pattern can be fixed by part of the 2*6 structure shown in FIG. 29. Or, the pilot pattern can be rotated (i.e., cyclically replaced).

Figure 30:
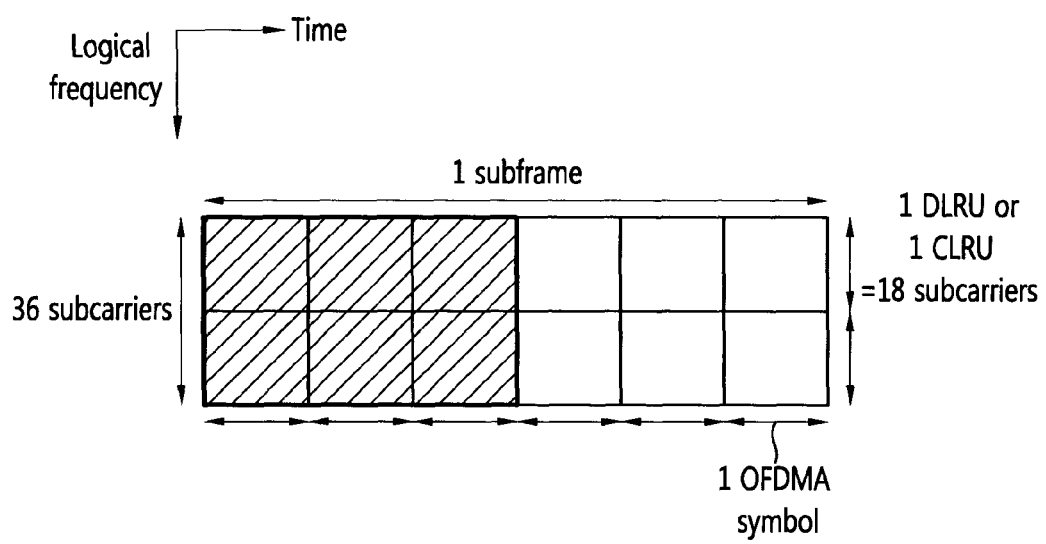
FIG. 30 is an example of a VBRU in which the frequency domain is extended twice.
Figure 31:
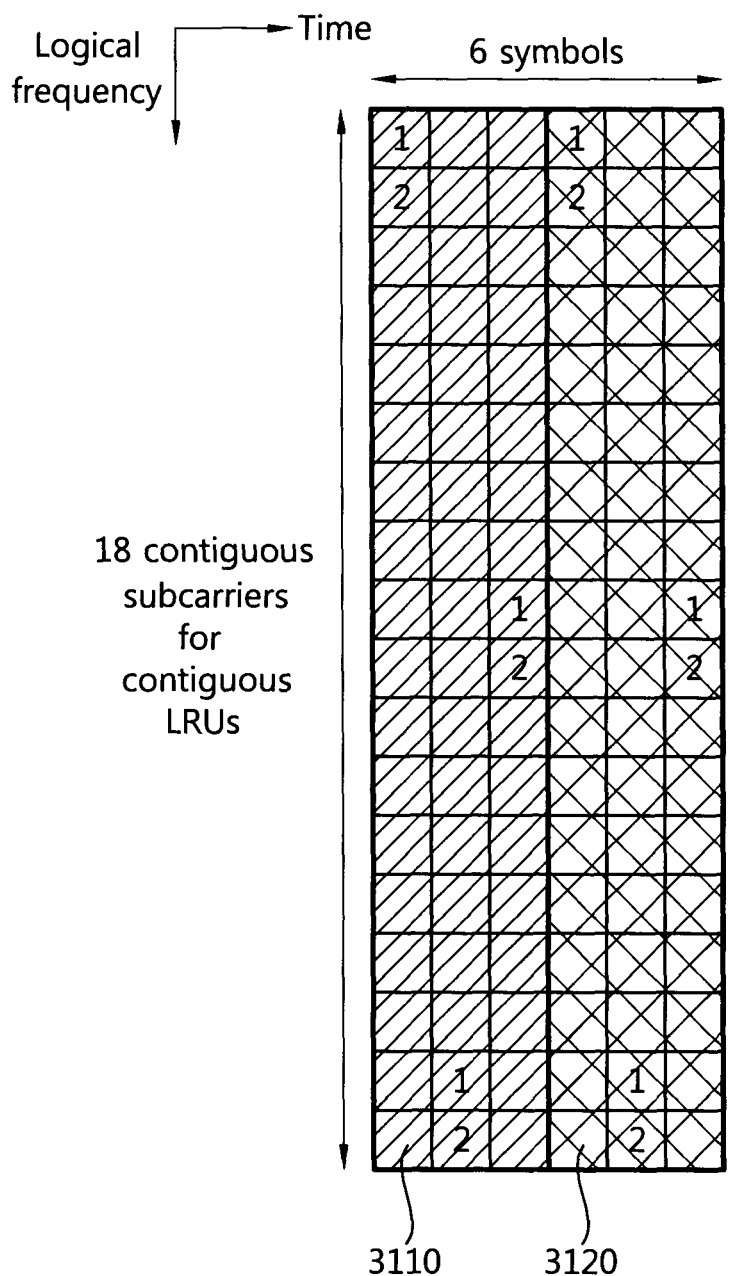
FIG. 31 is an example of a pilot pattern used in a CLRU.

FIG. 30 is an example of a VBRU in which the frequency domain is extended twice. FIG. 31 is an example of a pilot pattern used in a CLRU. If the VBRU of FIG. 30 is generated from a CLRU, a pilot pattern for the VBRU may become part of the example of FIG. 31. That is, a left 16*3 structure 3110 or a right 16*3 structure 3120 of FIG. 31 may be used without change. In this case, there is an advantage in that the pilot pattern of the VBRU becomes identical with the pilot pattern of an OBRU. Furthermore, the pilot pattern may be fixed by any one of the 16*3 structure shown in FIG. 31 and may be rotated in a specific pattern.

Figure 32:
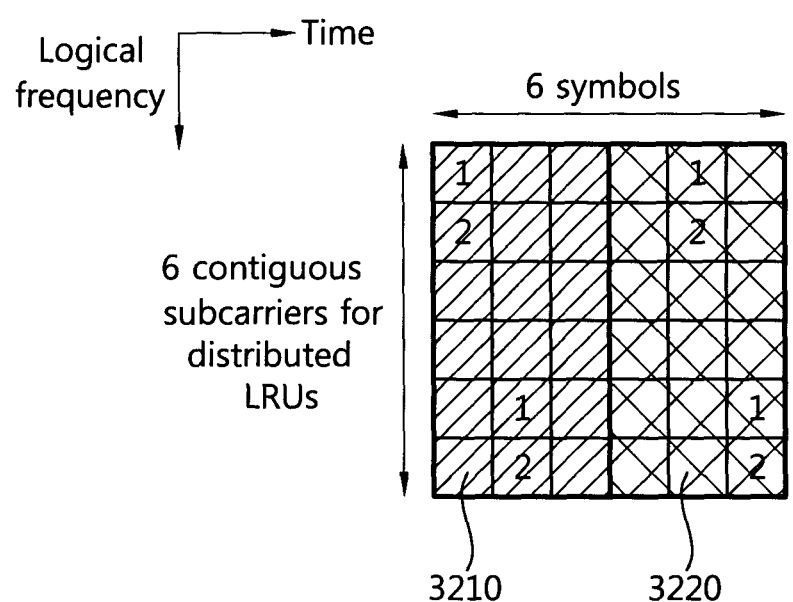
FIG. 32 is an example of a pilot pattern used in a DLRU.

FIG. 32 is an example of a pilot pattern used in a DLRU. If the VBRU of FIG. 30 is generated from the DLRU, a pilot pattern for the VBRU may become part of the example of FIG. 32. That is, a left 6*3 structure 3210 or a right 6*3 structure 3220 of FIG. 32 may be used without change. Furthermore, as described in the example of FIG. 31, the pilot pattern may be fixed or rotated.

In order to optimize the performance (e.g., channel estimation performance) of a VBRU, it is possible to newly define a pilot pattern for a VBRU. Meanwhile, if VBRUs having different sizes coexist, there may be a problem in that pilots are concentrated on a specific VBRU depending on how the VBRUs are deployed. This problem can be solved by adjusting a pilot boosting level depending on the number of pilots or a change of the deployment, controlling a coding rate of data, or performing non-coherent detection without a pilot.

Signaling for a VBRU is described below.

If a VBRU is allocated, the VBRU may be used in a specific region by setting the special region or the VBRU may be used without a limit to a region. If a VBRU is used without a special region, signaling for the VBRU may be the same as signaling for the existing OBRU. That is, the logical index of a DLRU or CLRU or the time/frequency positions of corresponding radio resources can be checked by applying signaling for the OBRU to the VBRU. Preferably, it may be informed that the VBRU is used through additional bits. For example, in the case of a VBRU extended in the time domain or the frequency domain, parameters related to $K_{sym}$ or $K_{sc}$ can be provided. That is, it may be informed that what place is a VBRU used from VBRUs that are started within an OBRU already allocated through additional information of several bits (e.g., 1 bit).

If a VBRU extended in the time domain and a VBRU extended in the frequency domain are used together, signaling may be performed through additional information (e.g., 2 bits) for identifying both the VBRUs. That is, the LSB may indicate a VBRU of one type, and the MSB may indicate a VBRU of the other type. If $K_{sym}$ or $K_{sc}$ is already set, signaling is reduced. If $K_{sym}$ or $K_{sc}$ is varied, information about a detailed size is also signalized.

If a VBRU is used, a new signaling method may be additionally used unlike in the case where an OBRU is used. For example, a minimum granularity of the frequency domain and a minimum granularity of the time domain may be defined, a resource unit having the minimum granularity in the frequency and time domains may be defined as a basic VBRU, and VBRUs having different sizes ma be extended/reduced in the time/frequency domains. Signaling may be performed by providing 2-dimensional information on the time/frequency (e.g., two diagonal vertexes of a quadrangle or a horizontal and vertical length with one point of the quadrangle) based on the defined VBRU. Or, a logical index may be received using the existing signaling information, and information on the degree that a basic VBRU is extended or reduced in the time domain may be additionally provided.

The case where a VBRU is used in a system in which an HAQR operates is described below. The existing HARQ resources and HARQ timing can be defined on the basis of frequency/time positions that are included in a VBRU. For example, if a VBRU extended in the time domain is sought to be used, it is preferred that HARQ timing be used on the basis of the latest OBRU region in the time domain (i.e., an OBRU region placed on the right side in the time axis) from a region occupied by the VBRU by taking the HARQ processing time into consideration.

If a VBRU extended in the frequency domain is sought to be used, HARQ may be performed on the basis of HARQ resources and timing for the existing OBRU that use a low logical index, from among a plurality of OBRUs, in order of MSs which use earlier regions in the time (i.e., a region placed on the left side in the time axis) within the OBRUs.

If an HARQ operation is performed, there may be problems in that a plurality of MSs is allocated to parts allocated as the existing one resource in accordance with the FDM or TDM method and the resources of control channels, such as ACK/NACK resources, overlap with each other among MSs allocated at the same time. For example, if a structure extended in the time axis is used, one transmission unit is defined as one resource in the existing control channel structure and this is extended to a plurality of channels. Accordingly, there is a need for a channel through which additional ACK/NACK can be transmitted by an extended multiple. To this end, resources to be used by an MS may be accessed using TDM or FDM. If extension is performed in the time domain, feedback may be performed using ACK/NACK resources at different timings depending on an MS that uses divided resources. In the case of FDM, it is a precondition that an MS sufficiently extends transmit power. Thus, transmission may be performed using a structure capable of performing transmission within a short time by dividing ACK/NACK channels in the time axis or designing a higher MCS or a new control channel.

The above-described contents may be used in systems other than systems that use OFDMA or SC-FDMA symbols. For example, the above-described contents may be used in a system that uses a single tone. For example, if transmission is performed using multiple subcarriers, an MS performs channel estimation at the time of reception and sends pilots through multiple subcarriers at the time of transmission. In this process, the MS has to perform a MIMO operation or perform an OFDMA (or SC-FDMA) processing task. If the MS operates in low-power mode (i.e., when the MS uses low transmit power or when the processing power level of the MS is low), however, this operation is inappropriate, processing conditions in H2H are not satisfied, or the total output power may not be achieved depending on a battery state.

In order to support low-power mode, a single tone operation or a single carrier operation for removing the complexity of baseband processing may be taken into consideration. Here, an MS may operate in the CDM method, but instead it is preferred that a sequence length or a bandwidth that satisfies a Cyclic Prefix (CP) length be selected. For example, if a CP length is ⅛ of an OFDMA (or SC-FDMA) symbol, one CDM channel may be configured by binding 8 subcarriers. In this case, a method of adding a CP may be a method of repeating a value corresponding to one chip length. However, a CDM channel may be configured by binding wider bands or a CDM channel may be configured using smaller bands.

Here, the CDM channel may be a CDM period within an OFDMA (or SC-FDMA) symbol, but may have a CDM structure in a specific time period. It is preferred that the CDM channel have a structure compatible with an OFDMA (or SC-FDMA) symbol structure, but not limited thereto. If the CDM channel has an incompatible structure, interference with subcarriers in OFDMA (or SC-FDMA) can be reduced by setting a specific guard band.

If an MS does not use CDM, the MS may assume a structure in which one bit is included in one OFDMA (or SC-FDMA) symbol by taking single tone modulation into consideration, set both a CP period and an available OFDMA (or SC-FDMA) symbol period to the same value, and send a constant signal value. Here, if the center frequency can be moved, subcarrier positions that enable the center frequency to be moved may be used for single carrier/tone purposes. For example, since a frequency raster is commonly used as 100 kHz, a single tone operation can be easily performed because a place spaced apart from the center frequency where a microcell is used by 100 kHz or a multiple thereof is a structure already supported in hardware. Or, a signal may be generated using a structure that may be mixed with a signal generated according to an FFT of a large size while transmission is performed by avoiding an FFT of a large size and using an FFT of a small size.

In the transmission of all coherent signals, a reference symbol on which a channel can be estimated is necessary, which is called a pilot. The pilot is information necessary to demodulate modulation information on a data symbol through channel estimation and is used in almost all communication systems. If, in the above-described contents, the extraction of information is based on non-coherent modulation and demodulation, all subcarriers and time periods can be used to transmit data without a pilot, such as in the energy detection or differential detection of a signal. If coherent modulation and demodulation are assumed, however, a pilot has to be transmitted at a position different from the time period where data subcarriers or data is transmitted. In order to support the transmission of the pilot, the pilot must be placed within a previously divided basic transmission unit. The pilot may have a structure in which the pilot is transmitted while occupying one OFDMA (or SC-FDMA) symbol or may have a structure in which the pilot is transmitted while spanning part of the one OFDMA (or SC-FDMA) symbol or multiple OFDMA (or SC-FDMA) symbols. Furthermore, if a strong channel correlation is established between MSs, a structure in which pilot resources are shared may be used. However, channel independency is recognized between most of MSs, an thus resources for the independent transmission of a pilot have to be allocated to each divided region.

In order to determine resources through which a pilot will be transmitted, subcarriers may be simply allocated or an OFDMA (or SC-FDMA) symbol may be allocated. Furthermore, if a very small number of subcarriers is used as in a single tone, data may be transmitted over the entire subcarriers, but the pilot signal may be transmitted in the same channel using a scheme, such as sequence spreading.

In the division of the above-described basic resources, if this structure is used for one MS, the remaining resources may be inefficiently used. In order to improve this problem, it is preferred that the structure be used only when MSs having similar characteristics coexist. Accordingly, the above-described method may be selectively used by a kind of BS configuration, which may be triggered at the request of an MS or a BS depending on an MS population. Furthermore, in order for the above-described contents to be used, it is preferred that several MSs be bound and scheduled at once. For example, if there are MSs which operate with low power while transmitting small data like a series of sensors and the MSs divide and use N resource allocation units, all the MSs may share the same resources and also scheduling information on only divided resources to be used by each MS may be separately transferred. That is, an indication of resources to be used by an MS group may be performed at once, and resources to be used by each MS may be denoted in a dynamic signaling form within the resources or may be determined and used in the form of a kind of upper signaling. If the resources are determined in an upper signaling form, the MS group is semi-statically determined. If the MS group is dynamically changed, however, information that may represent the ID of the MS group or the ID of each MS may be included in resource allocation information and transferred. Furthermore, it is preferred that information on the division of the allocated resources have a structure in which the information is transferred through integrated scheduling information or each piece of scheduling information. The structure may not have a multiple command structure in the form of a hierarchical resource allocation structure. In this case, another aspect of an access method is to directly indicate that what resources are directly divided for each MS and what part of the divided resources will be used. In this case, there is redundancy in the information transferred to each MS, but the degree of freedom in scheduling for the MS is high.

In addition to resources allocated to an MS, the MS has to transmit not only data, but also control information. Various pieces of information, such as ACK/NACK, a scheduling request), a CQI, and sounding, may become the transmitted control information. In order to transmit the various pieces of information to a BS with low power, the MS may have a different structure in a control channel or a structure in which the control channel is transmitted with low power. If the different control channel structure is used, the existing control channel is not used without change, but a channel through which the MS can transmit the pieces of information with low power may be designed in a new region so that resources for the control channel may be defined in a CDM form or FDM form in a channel including one or more subcarriers through the proposed resource division. Here, a spreading gain and a randomization gain or a suppression gain may be obtained from the generated control channel through time covering. In particular, spreading for distinguishing one MS from other MSs within the same cell may be defined or spreading for distinguishing sequences used by MSs within difference cells from each other may be defined. For example, in this structure, a set of sequences are defined in a specific transmission period over specific resources for use within the same cell, specific resources of the corresponding sequence set may be used as a control channel, and other MSs use other sequences. Here, assuming that an MS operates with low power, if transmission is performed during multiple transmission unit times because transmit power is small, an additional "cell-specific time cover sequence" may be defined in order to remove interference between neighbor cells.

Meanwhile, if a control signal is transmitted through the existing channel without using a new channel, when an MS transmits the control signal with low power, multiple control channels may be used in order to satisfy necessary QoS. Here, the multiple channels may be used in the frequency axis, but it is preferred that the multiple channels have a structure in which transmission is performed for a long time in order to concentrate more energy. Here, a transmission method may be performed in the same format in which control information is repeated. If there is an MS that performs the same operation in neighbor cells, no improvement is obtained due to the existence of interference. Accordingly, if the control channel and the same information are transmitted in the multiple transmission unit times, it is preferred that a structure be constructed so that it removes or suppresses inter-cell interference by applying a "time covering sequence".

The level of MS processing power may be lower than a level that is endured by H2H. In general, in order to access a cellular system, processing power and transmit power of a level that is required by H2H are necessary, but the status of an MS may shift to another state under negotiations with a BS after setting up connection with a network. For example, in order to reduce the power consumption of an MS, the MS may operate in low power or low clock mode. In this case, the amount of information that has to be processed by the MS may not meet a necessary processing power level. In order to meet the necessary processing power level, a BS may change the structure of information that is transmitted to the MS, determine a value different from a value for H2H communication for the time that the MS responds in response to the sent information, and control the uplink allocation for resources to be used by the MS according to the processing power of the MS. Furthermore, a structure in which the MS responds to a control channel for data traffic has to be changed into a structure in which the MS can process the response with a sufficient time. For example, an OFDM structure may be maintained so that resources through which corresponding control information is received only within a narrow band in FDM in receiving scheduling information are transmitted or are operated in a smaller size or a lower sampling frequency in a specific distributed pattern (e.g., an equal interval). In the resources configured as described above, although an MS receives control information, more time than H2H is consumed as compared with the case where processing power is insufficient in a decoding and baseband processing step. Accordingly, a point of time at which allocation control information is transferred and a point of time at which downlink traffic is transmitted may be differently set depending on the processing power of an MS, and a structure including information on the temporal position of the resources in scheduling information may be obtained. Furthermore, in uplink traffic, a different temporal relation structure from H2H for a series of temporal positions may be obtained. Furthermore, in the time when feedback information is transferred after data traffic is transmitted in DL or UL, a different temporal relation from that of H2H may be set by taking the processing time of an MS into consideration.

In the above-described examples, different access schemes may be applied to an OBRU and a VBRU. For example, an OBRU configured based on SC-FDMA and a VBRU based on OFDMA may be used together. The OBRU and the VBRU may be used not only in a data channel, but also in a control channel.

Figure 33:
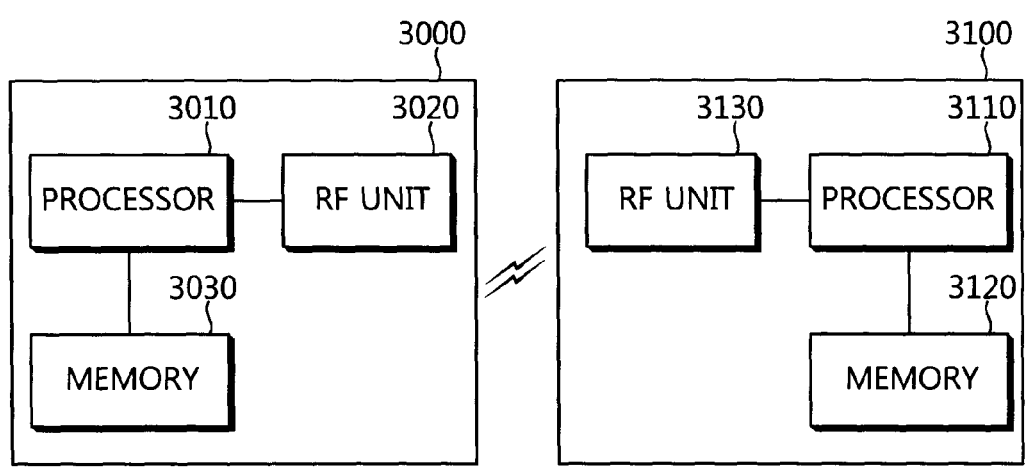
FIG. 33 shows an MS and BS according to embodiments.

FIG. 33 shows an MS and BS according to the above-described embodiments. The MS 3000 includes a processor 3010, memory 3030, and a Radio Frequency (RF) unit 3020. The processor 3010 may allocate radio resources based on externally provided information or information stored therein. Procedures, schemes, and functions performed by the MS in the above-described embodiments may be embodied by the processor 3010. The memory 3030 is connected to the processor 3010, and it stores various pieces of information for driving the processor 3010. The RF unit 3020 is connected to the processor 3010, and it transmits/receives radio signals.

The BS 3100 which communicates with an MS includes a processor 3110, memory 3120, and an RF unit 3130. Procedures, schemes, and functions performed by the BS in the above-described embodiments may be embodied by the processor 3110. The memory 3120 is connected to the processor 3110, and it stores various pieces of information for driving the processor 3110. The RF unit 3130 is connected to the processor 3110, and it transmits/receives radio signals.

The processor 3010, 3110 may include Application-Specific Integrated Circuits (ASICs), other chipsets, logic circuits and/or data processors. The memory 3020, 3120 may include Read-Only Memory (ROM), Random Access Memory (RAM), flash memory, memory cards, storage media and/or other storage devices. The RF unit 3030, 3130 may include a baseband circuit for processing a radio signal. When the above-described embodiment is embodied in software, the above-described scheme may be embodied using a module (process or function) that performs the above function. The module may be stored in the memory 3020, 3120 and executed by the processor 3010, 3110. The memory 3020, 3120 may be placed inside or outside the processor 3010, 3110 and connected to the processor 3010, 3110 using a variety of well-known means.

The present invention may be embodied using hardware, software, or a combination of them. In hardware implementations, the present invention may be embodied using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be embodied using a module performing the above function. The software may be stored in the memory and executed by the processor. The memory or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

The invention claimed is:

1. A method of a Mobile Station (MS) communicating with a network in a wireless communication system, the method comprising:
receiving a signal from the network; and
obtaining data which is included in the signal for the MS,
wherein the signal further includes data for a plurality of MSs, the data for the plurality of MSs is allocated to radio resources based on a plurality of resource units, the plurality of resource units is determined depending on an MS corresponding to each of the resource units, the plurality of resource units corresponds to frequency-time resources comprising at least one subcarrier in a frequency domain and at least one symbol in a time domain, and the plurality of resource units corresponds to frequency-time resources of different regions, and
wherein the radio resources for the MS are allocated in a Virtual Basic Resource Unit (VBRU), the VBRU is generated from an Original Basic Resource Unit (OBRU), and the VBRU is extended m times greater than the OBRU in the frequency domain and reduced m times smaller than the OBRU in the time domain, and the m is a specific natural number.

2. The method of claim 1, wherein each of the plurality of resource units corresponds to an identical number of tones.

3. The method of claim 1, wherein the plurality of resource units for the data of the plurality of MSs is determined based on a basic resource unit,
the basic resource unit comprises at least n subcarriers in the frequency domain and m symbols in the time domain, n and m are specific natural numbers,
a number of subcarriers included in each of the plurality of resource units is determined to be a positive number times the n, and
a number of symbols included in each of the plurality of resource units is determined to be a positive number times the m.

4. The method of claim 1, wherein the plurality of MSs includes a first MS and a second MS,
first data for the first MS is scheduled in a first resource unit for the first MS,
second data for the second MS is scheduled in a second resource unit for the second MS, and
the first resource unit and the second resource unit correspond to the frequency-time resources of the different regions.

5. The method of claim 1, wherein the symbol is an Orthogonal Frequency-Division Multiple Access (OFDMA) symbol and the subcarriers are consecutively disposed or distributed and disposed.

6. The method of claim 1, wherein the symbol is a Single Carrier Frequency-Division Multiple Access (SC-FDMA) symbol and the subcarriers are consecutively disposed or distributed and disposed.

7. A method of a Mobile Station (MS) communicating with a network in a wireless communication system, the method comprising:
receiving a first signal on which first data is allocated based on a first resource unit; and
receiving a second signal on which second data is allocated based on a second resource unit,
wherein the first and the second resource units correspond to frequency-time resources comprising at least one subcarrier in a frequency domain and at least one symbol in a time domain, the first resource unit and the second resource unit correspond to frequency-time resources of different regions, and the second resource unit is generated from the first resource unit, and
wherein each of the first and second resource units correspond to a Virtual Basic Resource Unit (VBRU), the VBRU is generated from an Original Basic Resource Unit (OBRU), and the VBRU is extended m times greater than the OBRU in the frequency domain and reduced m times smaller than the OBRU in the time domain, and the m is a specific natural number.

8. The method of claim 7, wherein the frequency domain of the second resource unit is extended m times greater than the frequency domain of the first resource unit,
the time domain of the second resource unit is reduced m times smaller than the time domain of the first resource unit, and the m is a specific natural number.

9. The method of claim 7, wherein the frequency domain of the second resource unit is reduced m times smaller than the frequency domain of the first resource unit,
the time domain of the second resource unit is extended m times greater than the time domain of the first resource unit, and the m is a specific natural number.

10. The method of claim 7, wherein the frequency domain of the second resource unit is extended m times greater than the frequency domain of the first resource unit or the time domain of the second resource unit is reduced m times smaller than the time domain of the first resource unit and the m is a specific natural number.

11. A method of transmitting data to a Mobile Station (MS) in a wireless communication system, the method comprising:

allocating data for a plurality of different MSs to radio resources; and transmitting the allocated data to the MSs, wherein the data is allocated based on a plurality of resource units, the plurality of resource units is determined depending on an MS corresponding to each of the resource units, the plurality of resource units correspond to frequency-time resources comprising at least one sub-carrier in a frequency domain and at least one symbol in a time domain, and the plurality of resource units corresponds to frequency-time resources of different regions, and wherein each of the resource units is a Virtual Basic Resource Unit (VBRU), the VBRU is generated from an Original Basic Resource Unit (OBRU), and the VBRU is extended m times greater than the OBRU in the frequency domain and reduced m times smaller than the OBRU in the time domain, and the m is a specific natural number.

12. A method of transmitting data to a Mobile Station (MS) in a wireless communication system, the method comprising:

transmitting a first signal on which first data is allocated based on a first resource unit to the MS; and transmitting a second signal on which second data is allocated based on a second resource unit to the MS, wherein the first and the second resource units correspond to frequency-time resources comprising at least one sub-carrier in a frequency domain and at least one symbol in a time domain, the first resource unit and the second resource unit correspond to frequency-time resources of different regions, and the second resource unit is generated from the first resource unit, and wherein each of the first and second resource units correspond to a Virtual Basic Resource Unit (VBRU), the VBRU is generated from an Original Basic Resource Unit (OBRU), and the VBRU is extended m times greater than the OBRU in the frequency domain and reduced m times smaller than the OBRU in the time domain, and the m is a specific natural number.

* * * * *